United States Patent
Yu et al.

(10) Patent No.: US 11,956,032 B2
(45) Date of Patent: Apr. 9, 2024

(54) METHOD FOR INDICATING A NUMBER OF MULTI-USER MULTIPLE-INPUT MULTIPLE-OUTPUT USERS AND COMMUNICATIONS APPARATUS

(71) Applicant: Huawei Technologies Co., Ltd., Shenzhen (CN)

(72) Inventors: Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 17/574,444

(22) Filed: Jan. 12, 2022

(65) Prior Publication Data
US 2022/0140868 A1 May 5, 2022

Related U.S. Application Data

(63) Continuation of application No. PCT/CN2020/099894, filed on Jul. 2, 2020.

(30) Foreign Application Priority Data

Jul. 12, 2019 (CN) .................. 201910630772.6

(51) Int. Cl.
*H04B 7/0452* (2017.01)
*H04L 1/00* (2006.01)
(Continued)

(52) U.S. Cl.
CPC ......... *H04B 7/0452* (2013.01); *H04L 1/0061* (2013.01); *H04L 1/1614* (2013.01); *H04L 5/0044* (2013.01); *H04L 5/0094* (2013.01)

(58) Field of Classification Search
None
See application file for complete search history.

(56) References Cited

U.S. PATENT DOCUMENTS 10,050,751 B2 * 8/2018 Choi .................. H04L 5/0094
10,219,271 B1 2/2019 Hedayat et al.
(Continued)

FOREIGN PATENT DOCUMENTS

CN 106576020 A 4/2017
CN 107820683 A 3/2018
(Continued)

OTHER PUBLICATIONS

Gan et al., "CR on PHY SIGB," IEEE P802.11 Wireless LANs, doc.: IEEE 802.11-19/1185r3, pp. 1-8, Institute of Electrical and Electronics Engineers, New York, New York (Jun. 26, 2019).
(Continued)

*Primary Examiner* — Otis L Thompson, Jr.
(74) *Attorney, Agent, or Firm* — Leydig, Voit & Mayer, Ltd.

(57) ABSTRACT

This application provides a method for indicating the number of MU-MIMO users and a communications apparatus. According to the method provided in this application, a case in which the number of users supported in the RU whose size is greater than or equal to a 106-tone RU is greater than 8 is indicated. Therefore, communication efficiency is improved. For example, the method may be applied to a WLAN system.

15 Claims, 19 Drawing Sheets

(51) Int. Cl.
    *H04L 1/1607*      (2023.01)
    *H04L 5/00*      (2006.01)

(56) References Cited

U.S. PATENT DOCUMENTS

| | | | | |
|---|---|---|---|---|
| 2015/0256309 | A1* | 9/2015 | Tong | H04L 5/0023 |
| | | | | 370/329 |
| 2016/0330300 | A1* | 11/2016 | Josiam | H04L 65/40 |
| 2017/0006608 | A1 | 1/2017 | Josiam et al. | |
| 2017/0048844 | A1 | 2/2017 | Chen et al. | |
| 2017/0149523 | A1* | 5/2017 | Li | H04L 5/0037 |
| 2018/0323921 | A1* | 11/2018 | Choi | H04B 7/0452 |
| 2019/0215037 | A1* | 7/2019 | Seok | H04L 5/00 |
| 2020/0396743 | A1* | 12/2020 | Park | H04W 76/11 |
| 2021/0007137 | A1* | 1/2021 | Abouelseoud | H04W 74/02 |
| 2021/0028917 | A1* | 1/2021 | Park | H04W 72/23 |
| 2023/0412330 | A1* | 12/2023 | Verma | H04W 72/27 |

FOREIGN PATENT DOCUMENTS

| | | |
|---|---|---|
| CN | 108200000 A | 6/2018 |
| CN | 108432173 A | 8/2018 |
| CN | 109586889 A | 4/2019 |
| CN | 109756297 A | 5/2019 |
| CN | 110768757 A | 2/2020 |

OTHER PUBLICATIONS

Stacey "Specification Framework for TGax," IEEE P802.11 Wireless LANs, doc.: IEEE 802.11-15/0132r15, pp. 1-61, Institute of Electrical and Electronics Engineers, New York, New York (May 25, 2016).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax™/ D4.1, pp. 1-754, Institute of Electrical and Electronics Engineers, New York, New York (Apr. 2019).

Yujin Noh "CRs on 28.3.3.8.," IEEE P802.11 Wireless LANS, doc.: IEEE 802.11-17/0945r0, 11-17-0945-00-00AX-CRS-ON-28-3-3-8, IEEE-SA Mentor, Piscataway, NJ, USA, vol. 802.11ax, pp. 1-9, XP068116297 (Jul. 2017).

\* cited by examiner

| Legacy short training field L-STF | Legacy long training field L-LTF | Legacy training field L-SIG | Repeated legacy signal field RL-SIG | High efficient signal field A HE-SIG-A | High efficient signal field B HE-SIG-B | High efficient short training field HE-STF | High efficient long training field HE-LTF | Data (data) | Packet extension PE |

FIG. 2

| Resource unit allocation subfield (first 242-tone RU) | CRC+tail (Tail) | Per station field (first 242-tone RU) |
|---|---|---|

FIG. 8

| | | | |
|---|---|---|---|
| CC 1 | Resource unit allocation subfield (first 242-tone RU) | CRC+tail (Tail) | Per station field (first 242-tone RU) |
| CC 2 | Resource unit allocation subfield (second 242-tone RU) | CRC+tail (Tail) | Per station field (second 242-tone RU) |

FIG. 9

| | Resource unit allocation subfield (first 242-tone RU) | Resource unit allocation subfield 3 (third 242-tone RU) | Center 26-tone resource unit indication (Center 26-Tone RU indication) | CRC+tail (Tail) | Per station field (first 242-tone RU and third 242-tone RU) |
|---|---|---|---|---|---|
| CC 1 | | | | | |
| CC 2 | Resource unit allocation subfield (second 242-tone RU) | Resource unit allocation subfield 3 (fourth 242-tone RU) | Center 26-tone resource unit indication (Center 26-Tone RU indication) | CRC+tail (Tail) | Per station field (second 242-tone RU and fourth 242-tone RU) |
| CC 1 | Resource unit allocation subfield (first 242-tone RU) | Resource unit allocation subfield 3 (third 242-tone RU) | Center 26-tone resource unit indication (Center 26-Tone RU indication) | CRC+tail (Tail) | Per station field (first 242-tone RU and third 242-tone RU) |
| CC 2 | Resource unit allocation subfield (second 242-tone RU) | Resource unit allocation subfield 3 (fourth 242-tone RU) | Center 26-tone resource unit indication (Center 26-Tone RU indication) | CRC+tail (Tail) | Per station field (second 242-tone RU and fourth 242-tone RU) |

FIG. 10

| 106-tone RU (10 MU-MIMO users) | 26-tone RU | 106-tone RU (three MU-MIMO users) | 106-tone RU (eight MU-MIMO users) | 26-tone RU | 52-tone RU | 26-tone RU |

FIG. 14

| CC 1 | Resource unit allocation subfield (first 242-tone RU) | CRC+tail (Tail) | MU-MIMO user number indication subfield | CRC+tail (Tail) | Per station field (first 242-tone RU) |

| CC 2 | Resource unit allocation subfield (second 242-tone RU) | CRC+tail (Tail) | MU-MIMO user number indication subfield | CRC+tail (Tail) | Per station field (second 242-tone RU) |

FIG. 15

SIG-B

| Resource unit allocation subfield 1 (first 242-tone RU) | ... | Resource unit allocation subfield N (N$^{th}$ 242-tone RU) | MU-MIMO user number indication subfield | ... | MU-MIMO user number indication subfield | CRC+tail (Tail) | Per station field |

FIG. 16

| CC 1 | Resource unit allocation subfield (first 242-tone RU) | MU-MIMO user number indication subfield | MU-MIMO user number indication subfield | CRC+tail (Tail) | Per station field (first 242-tone RU) |

| CC 2 | Resource unit allocation subfield (second 242-tone RU) | MU-MIMO user number indication subfield | MU-MIMO user number indication subfield | CRC+tail (Tail) | Per station field (second 242-tone RU) |

FIG. 17

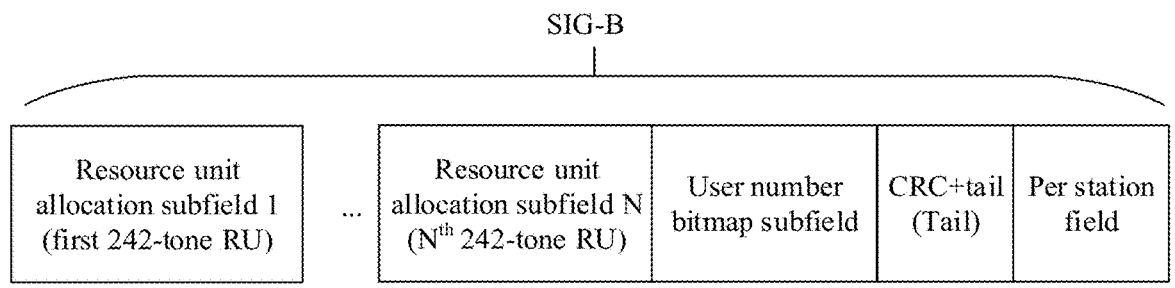

METHOD FOR INDICATING A NUMBER OF MULTI-USER MULTIPLE-INPUT MULTIPLE-OUTPUT USERS AND COMMUNICATIONS APPARATUS

CROSS-REFERENCE TO RELATED APPLICATIONS

This application is a continuation of International Application No. PCT/CN2020/099894, filed on Jul. 2, 2020, which claims priority to Chinese Patent Application No. 201910630772.6, filed on Jul. 12, 2019. The disclosures of the aforementioned applications are hereby incorporated by reference in their entireties.

TECHNICAL FIELD

This application relates to the communications field, and more specifically, to a method for indicating the number of multi-user multiple-input multiple-output users and a communications apparatus.

BACKGROUND

With evolution of 802.11 standard versions of a wireless local area network (WLAN) system, the number of spatial streams supported in the 802.11 standard in space domain significantly increases, for example, is expanded from one spatial stream supported in the 802.11a/g standard to 16 spatial streams supported in the 802.11ax standard. The number of supported users increases with the number of supported spatial streams. In a multi-user multiple-input multiple-output (MU-MIMO) system, it may be currently indicated that the number of MU-MIMO users supported in a resource unit that includes at least 106 subcarriers is not greater than 8. The number of spatial streams supported in the 802.11ax standard is greater than 8, and therefore the number of MU-MIMO users actually supported in the resource unit that includes at least 106 subcarriers may be greater than 8. In this case, how to indicate, during MU-MIMO transmission, a larger number of MU-MIMO users supported in the resource unit that includes at least 106 subcarriers, for example, to indicate the number of MU-MIMO users that is greater than 8, becomes a problem that needs to be currently urgently resolved.

SUMMARY

This application provides a method for indicating the number of multi-user multiple-input multiple-output users and a communications apparatus. A resource unit allocation subfield is designed, or a new indication field is added, to indicate a case in which the number of users supported in an RU whose size is greater than or equal to a 106-tone RU is greater than 8. Therefore, resource utilization and communication efficiency are improved.

According to a first aspect, a method for indicating the number of multi-user multiple-input multiple-output users is provided. The method may be performed by a sending device. For example, the sending device may be an AP or a STA. Alternatively, the method may be performed by a chip applied to a sending device. For example, the method is performed by the sending device. The method includes: The sending device generates a physical layer protocol data unit (PPDU), where the PPDU includes a signal field B, the signal field B includes at least one resource unit allocation subfield, the resource unit allocation subfield is a resource unit allocation index, the resource unit allocation index is used to indicate a resource unit arrangement and combination, the resource unit allocation index is further used to indicate the number of multi-user multiple-input multiple-output MU-MIMO users supported in a resource unit that includes at least 106 subcarriers, and the number of MU-MIMO users is greater than 8; and the sending device sends the PPDU.

According to the method for indicating the number of multi-user multiple-input multiple-output users provided in the first aspect, the resource unit allocation index is designed, so that the resource unit allocation index may indicate a case in which the number of users supported in the RU whose size is greater than or equal to a 106-tone RU is greater than 8. The existing signal field B is slightly changed, and this is easy to implement. Therefore, resource utilization and communication efficiency are improved.

In an embodiment of the first aspect, the resource unit allocation index includes a first index and a second index that are used to indicate a same resource unit arrangement and combination, the first index indicates the number of MU-MIMO users supported in the resource unit that includes at least 106 subcarriers, the number of MU-MIMO users is less than or equal to 8, the second index indicates the number of MU-MIMO users supported in the resource unit that includes at least 106 subcarriers, and the number of MU-MIMO users is greater than 8. In this implementation, different indexes of the same resource unit arrangement and combination are used to respectively indicate the number of MU-MIMO users that is greater than 8 and the number of MU-MIMO users that is less than or equal to 8. In this way, resources used to indicate the number of MU-MIMO users can be saved, and resource utilization of the resource unit index is improved.

In an embodiment of the first aspect, the resource unit allocation index includes a field used to indicate the number of MU-MIMO users supported in the resource unit that includes at least 106 subcarriers, a length of the field is greater than or equal to 4 bits, and the number of MU-MIMO users is greater than 8. In this implementation, the indication field whose length is greater than or equal to 4 bits is used to indicate the number of MU-MIMO users supported in the resource unit that includes at least 106 subcarriers. In this way, it is easy to indicate the number of MU-MIMO users that is greater than 8, and accuracy of indicating the number of MU-MIMO users is improved. In addition, this is easy to implement.

In an embodiment of the first aspect, the signal field B further includes a first indication subfield, and the first indication subfield is used to indicate a bit width of the resource unit allocation index. In this implementation, the first indication subfield is set in the signal field B, so that a receiving device may accurately receive and parse the resource unit allocation subfield, to improve efficiency of determining, by the receiving device, the resource unit arrangement and combination and the number of MU-MIMO users that are indicated in the resource unit allocation subfield.

In an embodiment of the first aspect, the resource unit allocation index is an 8-bit index or a 9-bit index.

According to a second aspect, a method for indicating the number of multi-user multiple-input multiple-output users is provided. The method may be performed by a sending device. For example, the sending device may be an AP or a STA. Alternatively, the method may be performed by a chip applied to a sending device. For example, the method is performed by the sending device. The method includes: The sending device generates a physical layer protocol data unit (PPDU), where the PPDU includes a signal field B, the signal field B includes at least one resource unit allocation subfield and a second indication field, the resource unit allocation subfield is used to indicate a resource unit arrangement and combination, the at least one resource unit allocation subfield and the second indication field jointly indicate the number of MU-MIMO users supported in a resource unit that includes at least 106 subcarriers, and the number of MU-MIMO users is greater than 8; and the sending device sends the PPDU.

According to the method for indicating the number of multi-user multiple-input multiple-output users provided in the second aspect, the second indication field is added to the signal field B, and the second indication field and the at least one resource unit allocation subfield are used to jointly indicate a case in which the number of users supported in the RU whose size is greater than or equal to a 106-tone RU is greater than 8. A new indication field is added, so that the number of MU-MIMO users that is greater than 8 may be accurately and conveniently indicated. In addition, an existing resource unit allocation index table does not need to be changed, and this is easy to implement. Therefore, efficiency of indicating the number of MU-MIMO users that is greater than 8 is improved.

In an embodiment of the second aspect, the second indication field includes at least one MU-MIMO user number indication subfield, the MU-MIMO user number indication subfield is in a one-to-one correspondence with a resource unit that is indicated in the resource unit allocation subfield, that includes at least 106 subcarriers, and that supports eight MU-MIMO users, the MU-MIMO user number indication subfield is used to indicate the number of MU-MIMO users supported in a corresponding resource unit, and the number of MU-MIMO users is greater than 8. In this implementation, CRC check and coding are separately performed on the at least one resource unit allocation subfield and the at least one MU-MIMO user number indication subfield, and the at least one resource unit allocation subfield and the at least one MU-MIMO user number indication subfield are used to indicate the number of MU-MIMO users. In this way, efficiency of indicating the number of MU-MIMO users can be improved, an unnecessary MU-MIMO user number indication subfield is avoided, there are relatively small overheads, and resources are saved. In addition, this helps a receiving device perform parsing to obtain the number of MU-MIMO users. Therefore, efficiency of indicating the number of MU-MIMO users that is greater than 8 is improved.

In an embodiment of the second aspect, the second indication field includes at least one MU-MIMO user number indication subfield, the number of MU-MIMO user number indication subfields is the same as a maximum value of the number of possible resource units that include at least 106 subcarriers, the MU-MIMO user number indication subfield is used to indicate the number of MU-MIMO users supported in a corresponding resource unit, and the number of MU-MIMO users is greater than 8. In this implementation, CRC check and coding are performed on the at least one resource unit allocation subfield and the at least one MU-MIMO user number indication subfield in a unified manner, and the at least one resource unit allocation subfield and the at least one MU-MIMO user number indication subfield are used to indicate the number of MU-MIMO users. In this way, it can be ensured that there is a corresponding MU-MIMO user number indication subfield for each RU whose size is greater than or equal to the 106-tone RU, and reliability of indicating the number of MU-MIMO users that is greater than 8 is ensured.

In an embodiment of the second aspect, the second indication field includes a user number bitmap subfield, a bit of the user number bitmap subfield is in a one-to-one correspondence with a resource unit that is indicated in the resource unit allocation subfield and that includes at least 106 subcarriers, and the bit of the user number bitmap subfield is used to indicate that the number of MU-MIMO users supported in a corresponding resource unit is an actual number of MU-MIMO users or a difference between an actual number of MU-MIMO users and 8. In this implementation, CRC check and coding are separately performed on the at least one resource unit allocation subfield and the user number bitmap subfield, and the at least one resource unit allocation subfield and the user number bitmap subfield are used to jointly indicate the number of MU-MIMO users. In this way, efficiency of indicating the number of MU-MIMO users can be improved, an unnecessary or useless user number bit is avoided, there are relatively small overheads, and resources are saved. In addition, this helps a receiving device perform parsing to obtain the number of MU-MIMO users. Therefore, efficiency of indicating the number of MU-MIMO users that is greater than 8 is improved.

In an embodiment of the second aspect, the second indication field includes a user number bitmap subfield, a length of the user number bitmap subfield is the same as a maximum value of the number of possible resource units that include at least 106 subcarriers, and a bit of the user number bitmap subfield is used to indicate that the number of MU-MIMO users supported in a corresponding resource unit is an actual number of MU-MIMO users or a difference between an actual number of MU-MIMO users and 8. In this implementation, CRC check and coding are performed on the at least one resource unit allocation subfield and the user number bitmap subfield in a unified manner, and the at least one resource unit allocation subfield and the user number bitmap subfield are used to indicate the number of MU-MIMO users. In this way, it can be ensured that there is a corresponding user number bit for each RU whose size is greater than or equal to the 106-tone RU, and reliability of indicating the number of MU-MIMO users that is greater than 8 is ensured. In addition, there are relatively small overheads.

According to a third aspect, a method for indicating the number of multi-user multiple-input multiple-output users is provided. The method may be performed by a sending device. For example, the sending device may be an AP or a STA. Alternatively, the method may be performed by a chip applied to a sending device. For example, the method is performed by the sending device. The method includes: The sending device generates a physical layer protocol data unit (PPDU), where the PPDU includes a signal field B, the signal field B includes at least one resource unit allocation subfield and at least one per station field, the resource unit allocation subfield is used to indicate a resource unit arrangement and combination, a sequence of the at least one per station field corresponds to a sequence of the resource unit arrangement and combination, the per station field is used to indicate the number of MU-MIMO users supported in a resource unit that includes at least 106 subcarriers, and the number of MU-MIMO users is greater than 8; and the sending device sends the PPDU.

According to the method for indicating the number of multi-user multiple-input multiple-output users provided in the third aspect, the per station field in the signal field B is used to indicate the number of MU-MIMO users supported in the corresponding resource unit that includes at least 106 subcarriers, and the number of MU-MIMO users is greater than 8. In this way, a case in which the number of users supported in the RU whose size is greater than or equal to a 106-tone RU is greater than 8 is indicated. Therefore, the number of MU-MIMO users that is greater than 8 can be accurately and conveniently indicated. In addition, an existing resource unit allocation index table does not need to be changed, and this is easy to implement. Therefore, efficiency of indicating the number of MU-MIMO users that is greater than 8 is improved.

In an embodiment of the third aspect, a first per station field in the at least one per station field includes a MU-MIMO user number indication subfield, the first per station field corresponds to the resource unit that includes at least 106 subcarriers, the MU-MIMO user number indication subfield is used to indicate the number of MU-MIMO users supported in the resource unit that includes at least 106 subcarriers, and the number of MU-MIMO users is greater than 8. In this implementation, the MU-MIMO user number indication subfield included in the per station field is used to indicate the number of MU-MIMO users in a resource unit in which a station is located. In this way, efficiency of indicating the number of MU-MIMO users can be improved. In addition, this helps a receiving device perform parsing to obtain the number of MU-MIMO users. Therefore, efficiency of indicating the number of MU-MIMO users that is greater than 8 is improved.

In an embodiment of the third aspect, a first per station field in the at least one per station field includes a third indication subfield, the first per station field corresponds to the resource unit that includes at least 106 subcarriers, and the third indication subfield is used to indicate whether a station indicated in the first per station field is a last station in the resource unit that includes at least 106 subcarriers. In this implementation, it is indicated whether a station indicated in the per station field is a last station in a resource in which the station is located. In this way, efficiency of indicating the number of MU-MIMO users is improved.

According to a fourth aspect, a method for indicating the number of multi-user multiple-input multiple-output users is provided. The method may be performed by a receiving device. For example, the receiving device may be an AP or a STA. Alternatively, the method may be performed by a chip applied to a receiving device. For example, the method is performed by the receiving device. The method includes: The receiving device receives a physical layer protocol data unit (PPDU), where the PPDU includes a signal field B, the signal field B includes at least one resource unit allocation subfield, the resource unit allocation subfield is a resource unit allocation index, the resource unit allocation index is used to indicate a resource unit arrangement and combination, the resource unit allocation index is further used to indicate the number of multi-user multiple-input multiple-output MU-MIMO users supported in a resource unit that includes at least 106 subcarriers, and the number of MU-MIMO users is greater than 8; and the receiving device determines, based on the at least one resource unit allocation subfield, the number of MU-MIMO users supported in the resource unit that includes at least 106 subcarriers.

According to the method for indicating the number of multi-user multiple-input multiple-output users provided in the fourth aspect, the resource unit allocation index is designed, so that the receiving device may determine, based on the resource unit allocation index, that the number of users supported in the RU whose size is greater than or equal to a 106-tone RU is greater than 8. The existing signal field B is slightly changed, and this is easy to implement. Therefore, resource utilization and communication efficiency are improved.

In an embodiment of the fourth aspect, the resource unit allocation index includes a first index and a second index that are used to indicate a same resource unit arrangement and combination, the first index indicates the number of MU-MIMO users supported in the resource unit that includes at least 106 subcarriers, the number of MU-MIMO users is less than or equal to 8, the second index indicates the number of MU-MIMO users supported in the resource unit that includes at least 106 subcarriers, and the number of MU-MIMO users is greater than 8; and the determining, based on the at least one resource unit allocation subfield, the number of MU-MIMO users supported in the resource unit that includes at least 106 subcarriers includes: determining, based on the first index and the second index, the number of MU-MIMO users supported in the resource unit that includes at least 106 subcarriers.

In an embodiment of the fourth aspect, the resource unit allocation index includes a field used to indicate the number of MU-MIMO users supported in the resource unit that includes at least 106 subcarriers, a length of the field is greater than or equal to 4 bits, and the number of MU-MIMO users is greater than 8; and the determining, based on the at least one resource unit allocation subfield, the number of MU-MIMO users supported in the resource unit that includes at least 106 subcarriers includes: determining, based on the field, the number of MU-MIMO users supported in the resource unit that includes at least 106 subcarriers.

In an embodiment of the fourth aspect, the signal field B further includes a first indication subfield, and the first indication subfield is used to indicate a bit width of the at least one resource unit allocation index; and the method further includes: The receiving device determines the bit width of the resource unit allocation index based on the first indication subfield.

In an embodiment of the fourth aspect, the resource unit allocation index is an 8-bit index or a 9-bit index.

According to a fifth aspect, a method for indicating the number of multi-user multiple-input multiple-output users is provided. The method may be performed by a receiving device. For example, the receiving device may be an AP or a STA. Alternatively, the method may be performed by a chip applied to a receiving device. For example, the method is performed by the receiving device. The method includes: The receiving device receives a physical layer protocol data unit (PPDU), where the PPDU includes a signal field B, the signal field B includes at least one resource unit allocation subfield and a second indication field, the resource unit allocation subfield is used to indicate a resource unit arrangement and combination, the at least one resource unit allocation subfield and the second indication field jointly indicate the number of MU-MIMO users supported in a resource unit that includes at least 106 subcarriers, and the number of MU-MIMO users is greater than 8; and the receiving device determines, based on the at least one resource unit allocation subfield and the second indication field, the number of MU-MIMO users supported in the resource unit that includes at least 106 subcarriers.

According to the method for indicating the number of multi-user multiple-input multiple-output users provided in the fifth aspect, the second indication field is added to the signal field B, and the second indication field and the at least one resource unit allocation subfield are used to jointly indicate a case in which the number of users supported in the RU whose size is greater than or equal to a 106-tone RU is greater than 8. A new indication field is added, so that the number of MU-MIMO users that is greater than 8 may be accurately and conveniently indicated. In addition, an existing resource unit allocation index table does not need to be changed, and this is easy to implement. Therefore, efficiency of indicating the number of MU-MIMO users that is greater than 8 is improved.

In an embodiment of the fifth aspect, the second indication field includes at least one MU-MIMO user number indication subfield, the MU-MIMO user number indication subfield is in a one-to-one correspondence with a resource unit that is indicated in the resource unit allocation subfield, that includes at least 106 subcarriers, and that supports eight MU-MIMO users, the MU-MIMO user number indication subfield is used to indicate the number of MU-MIMO users supported in a corresponding resource unit, and the number of MU-MIMO users is greater than 8.

In an embodiment of the fifth aspect, the second indication field includes at least one MU-MIMO user number indication subfield, the number of MU-MIMO user number indication subfields is the same as a maximum value of the number of possible resource units that include at least 106 subcarriers, the MU-MIMO user number indication subfield is used to indicate the number of MU-MIMO users supported in a corresponding resource unit, and the number of MU-MIMO users is greater than 8.

In an embodiment of the fifth aspect, the second indication field includes a user number bitmap subfield, a bit of the user number bitmap subfield is in a one-to-one correspondence with a resource unit that is indicated in the resource unit allocation subfield and that includes at least 106 subcarriers, and the bit of the user number bitmap subfield is used to indicate that the number of MU-MIMO users supported in a corresponding resource unit is an actual number of MU-MIMO users or a difference between an actual number of MU-MIMO users and 8.

In an embodiment of the fifth aspect, the second indication field includes a user number bitmap subfield, a length of the user number bitmap subfield is the same as a maximum value of the number of possible resource units that include at least 106 subcarriers, and a bit of the user number bitmap subfield is used to indicate that the number of MU-MIMO users supported in a corresponding resource unit is an actual number of MU-MIMO users or a difference between an actual number of MU-MIMO users and 8.

According to a sixth aspect, a method for indicating the number of multi-user multiple-input multiple-output users is provided. The method may be performed by a receiving device. For example, the receiving device may be an AP or a STA. Alternatively, the method may be performed by a chip applied to a receiving device. For example, the method is performed by the receiving device. The method includes: The receiving device receives a physical layer protocol data unit (PPDU), where the PPDU includes a signal field B, the signal field B includes at least one resource unit allocation subfield and at least one per station field, the resource unit allocation subfield is used to indicate a resource unit arrangement and combination, a sequence of the at least one per station field corresponds to a sequence of the resource unit arrangement and combination, the per station field is used to indicate the number of MU-MIMO users supported in a resource unit that includes at least 106 subcarriers, and the number of MU-MIMO users is greater than 8; and the receiving device determines, based on the at least one resource unit allocation subfield and the at least one per station field, the number of MU-MIMO users supported in the resource unit that includes at least 106 subcarriers.

According to the method for indicating the number of multi-user multiple-input multiple-output users provided in the sixth aspect, the per station field in the signal field B is used to indicate the number of MU-MIMO users supported in the corresponding resource unit that includes at least 106 subcarriers. In this way, a case in which the number of users supported in the RU whose size is greater than or equal to a 106-tone RU is greater than 8 is indicated. Therefore, the number of MU-MIMO users that is greater than 8 can be accurately and conveniently indicated. In addition, an existing resource unit allocation index table does not need to be changed, and this is easy to implement. Therefore, efficiency of indicating the number of MU-MIMO users that is greater than 8 is improved.

In an embodiment of the sixth aspect, a first per station field in the at least one per station field includes a MU-MIMO user number indication subfield, the first per station field corresponds to the resource unit that includes at least 106 subcarriers, the MU-MIMO user number indication subfield is used to indicate the number of MU-MIMO users supported in the resource unit that includes at least 106 subcarriers, and the number of MU-MIMO users is greater than 8.

In an embodiment of the sixth aspect, a first per station field in the at least one per station field includes a third indication subfield, the first per station field corresponds to the resource unit that includes at least 106 subcarriers, and the third indication subfield is used to indicate whether a station indicated in the first per station field is a last station in the resource unit that includes at least 106 subcarriers.

According to a seventh aspect, a communications apparatus is provided. The apparatus includes: a processing unit, configured to generate a physical layer protocol data unit (PPDU), where the PPDU includes a signal field B, the signal field B includes at least one resource unit allocation subfield, the resource unit allocation subfield is a resource unit allocation index, the resource unit allocation index is used to indicate a resource unit arrangement and combination, the resource unit allocation index is further used to indicate the number of multi-user multiple-input multiple-output MU-MIMO users supported in a resource unit that includes at least 106 subcarriers, and the number of MU-MIMO users is greater than 8; and a communications unit, configured to send the PPDU.

The apparatus provided in the seventh aspect is configured to perform any one of the first aspect or the embodiments of the first aspect. For specific details, refer to any one of the first aspect or the embodiments of the first aspect. Details are not described herein again.

According to an eighth aspect, a communications apparatus is provided. The apparatus includes: a processing unit, configured to generate a physical layer protocol data unit (PPDU), where the PPDU includes a signal field B, the signal field B includes at least one resource unit allocation subfield and a second indication field, the resource unit allocation subfield is used to indicate a resource unit arrangement and combination, the at least one resource unit allocation subfield and the second indication field jointly indicate the number of MU-MIMO users supported in a resource unit that includes at least 106 subcarriers, and the number of MU-MIMO users is greater than 8; and a communications unit, configured to send the PPDU.

The apparatus provided in the eighth aspect is configured to perform any one of the second aspect or the embodiments of the second aspect. For specific details, refer to any one of the second aspect or the embodiments of the second aspect. Details are not described herein again.

According to a ninth aspect, a communications apparatus is provided. The apparatus includes: a processing unit, configured to generate a physical layer protocol data unit (PPDU), where the PPDU includes a signal field B, the signal field B includes at least one resource unit allocation subfield and at least one per station field, the resource unit allocation subfield is used to indicate a resource unit arrangement and combination, a sequence of the at least one per station field corresponds to a sequence of the resource unit arrangement and combination, the per station field is used to indicate the number of MU-MIMO users supported in a resource unit that includes at least 106 subcarriers, and the number of MU-MIMO users is greater than 8; and a communications unit, configured to send the PPDU.

The apparatus provided in the ninth aspect is configured to perform the method according to any one of the third aspect or the embodiments of the third aspect. For details, refer to the any one of the third aspect or the embodiments of the third aspect. Details are not described herein.

According to a tenth aspect, a communications apparatus is provided. The apparatus includes: a communications unit, configured to receive a physical layer protocol data unit (PPDU), where the PPDU includes a signal field B, the signal field B includes at least one resource unit allocation subfield, the resource unit allocation subfield is a resource unit allocation index, the resource unit allocation index is used to indicate a resource unit arrangement and combination, the resource unit allocation index is further used to indicate the number of multi-user multiple-input multiple-output MU-MIMO users supported in a resource unit that includes at least 106 subcarriers, and the number of MU-MIMO users is greater than 8; and a processing unit, configured to determine, based on the at least one resource unit allocation subfield, the number of MU-MIMO users supported in the resource unit that includes at least 106 subcarriers.

The apparatus provided in the tenth aspect is configured to perform the method according to any one of the fourth aspect or the embodiments of the fourth aspect. For details, refer to the any one of the fourth aspect or the embodiments of the fourth aspect. Details are not described herein.

According to an eleventh aspect, a communications apparatus is provided. The apparatus includes: a communications unit, configured to receive a physical layer protocol data unit (PPDU), where the PPDU includes a signal field B, the signal field B includes at least one resource unit allocation subfield and a second indication field, the resource unit allocation subfield is used to indicate a resource unit arrangement and combination, the at least one resource unit allocation subfield and the second indication field jointly indicate the number of MU-MIMO users supported in a resource unit that includes at least 106 subcarriers, and the number of MU-MIMO users is greater than 8; and a processing unit, configured to determine, based on the at least one resource unit allocation subfield and the second indication field, the number of MU-MIMO users supported in the resource unit that includes at least 106 subcarriers.

The apparatus provided in the eleventh aspect is configured to perform any one of the fifth aspect or the embodiments of the fifth aspect. For specific details, refer to any one of the fifth aspect or the embodiments of the fifth aspect. Details are not described herein again.

According to a twelfth aspect, a communications apparatus is provided. The apparatus includes: a communications unit, configured to receive a physical layer protocol data unit (PPDU), where the PPDU includes a signal field B, the signal field B includes at least one resource unit allocation subfield and at least one per station field, the resource unit allocation subfield is used to indicate a resource unit arrangement and combination, a sequence of the at least one per station field corresponds to a sequence of the resource unit arrangement and combination, the per station field is used to indicate the number of MU-MIMO users supported in a resource unit that includes at least 106 subcarriers, and the number of MU-MIMO users is greater than 8; and a processing unit, configured to determine, based on the at least one resource unit allocation subfield and the at least one per station field, the number of MU-MIMO users supported in the resource unit that includes at least 106 subcarriers.

The apparatus provided in the twelfth aspect is configured to perform any one of the sixth aspect or the embodiments of the sixth aspect. For specific details, refer to any one of the sixth aspect or the embodiments of the sixth aspect. Details are not described herein again.

According to a thirteenth aspect, a communications apparatus is provided. The apparatus includes a processor and a transceiver that is internally connected to and communicates with the processor. The processor is configured to generate a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The transceiver is configured to send the PPDU.

The apparatus provided in the thirteenth aspect is configured to perform any one of the first aspect or the embodiments of the first aspect. For specific details, refer to any one of the first aspect or the embodiments of the first aspect. Details are not described herein again.

According to a fourteenth aspect, a communications apparatus is provided. The apparatus includes a processor and a transceiver that is internally connected to and communicates with the processor. The processor is configured to generate a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The transceiver is configured to send the PPDU.

The apparatus provided in the fourteenth aspect is configured to perform any one of the second aspect or the embodiments of the second aspect. For specific details, refer to any one of the second aspect or the embodiments of the second aspect. Details are not described herein again.

According to a fifteenth aspect, a communications apparatus is provided. The apparatus includes a processor and a transceiver that is internally connected to and communicates with the processor. The processor is configured to generate a physical layer protocol data unit (PPDU). The PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8. The transceiver is configured to send the PPDU.

The apparatus provided in the fifteenth aspect is configured to perform the method according to any one of the third aspect or the embodiments of the third aspect. For details, refer to the any one of the third aspect or the embodiments of the third aspect. Details are not described herein.

According to a sixteenth aspect, a communications apparatus is provided. The apparatus includes a processor and a transceiver that is internally connected to and communicates with the processor. The transceiver is configured to receive a physical layer protocol data unit (PPDU). The PPDU includes a signal field B. The signal field B includes at least one resource unit allocation subfield. The resource unit allocation subfield is a resource unit allocation index. The resource unit allocation index is used to indicate a resource unit arrangement and combination. The resource unit allocation index is further used to indicate the number of multi-user multiple-input multiple-output MU-MIMO users supported in a resource unit that includes at least 106 subcarriers. The number of MU-MIMO users is greater than 8. The processor is configured to determine, based on the at least one resource unit allocation subfield, the number of MU-MIMO users supported in the resource unit that includes at least 106 subcarriers.

The apparatus provided in the sixteenth aspect is configured to perform the method according to any one of the fourth aspect or the embodiments of the fourth aspect. For details, refer to the any one of the fourth aspect or the embodiments of the fourth aspect. Details are not described herein.

According to a seventeenth aspect, a communications apparatus is provided. The apparatus includes a processor and a transceiver that is internally connected to and communicates with the processor. The transceiver is configured to receive a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The processor is configured to determine, based on the at least one resource unit allocation subfield and the second indication field, the number of MU-MIMO users supported in the resource unit that includes at least 106 subcarriers. The apparatus provided in the seventeenth aspect is configured to perform any one of the fifth aspect or the embodiments of the fifth aspect. For specific details, refer to any one of the fifth aspect or the embodiments of the fifth aspect. Details are not described herein again.

According to an eighteenth aspect, a communications apparatus is provided. The apparatus includes a processor and a transceiver that is internally connected to and communicates with the processor. The transceiver is configured to receive a physical layer protocol data unit (PPDU). The PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8. The processor determines, based on the at least one resource unit allocation subfield and the at least one per station field, the number of MU-MIMO users supported in the resource unit that includes at least 106 subcarriers.

According to a nineteenth aspect, a communications apparatus is provided. The apparatus includes a processing circuit and a communications interface that is internally connected to and communicates with the processing circuit. The processing circuit is configured to generate a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The communications interface is configured to send the PPDU.

The apparatus provided in the nineteenth aspect is configured to perform any one of the first aspect or the embodiments of the first aspect. For specific details, refer to any one of the first aspect or the embodiments of the first aspect. Details are not described herein again.

According to a twentieth aspect, a communications apparatus is provided. The apparatus includes a processing circuit and a communications interface that is internally connected to and communicates with the processing circuit. The processing circuit is configured to generate a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The communications interface is configured to send the PPDU.

The apparatus provided in the twentieth aspect is configured to perform any one of the second aspect or the embodiments of the second aspect. For specific details, refer to any one of the second aspect or the embodiments of the second aspect. Details are not described herein again.

According to a twenty-first aspect, a communications apparatus is provided. The apparatus includes a processing circuit and a communications interface that is internally connected to and communicates with the processing circuit. The processing circuit is configured to generate a physical layer protocol data unit (PPDU). The PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8. The communications interface is configured to send the PPDU.

The apparatus provided in the twenty-first aspect is configured to perform the method according to any one of the third aspect or the embodiments of the third aspect. For details, refer to the any one of the third aspect or the embodiments of the third aspect. Details are not described herein.

According to a twenty-second aspect, a communications apparatus is provided. The apparatus includes a processing circuit and a communications interface that is internally connected to and communicates with the processing circuit. The communications interface is configured to receive a physical layer protocol data unit (PPDU). The PPDU includes a signal field B. The signal field B includes at least one resource unit allocation subfield. The resource unit allocation subfield is a resource unit allocation index. The resource unit allocation index is used to indicate a resource unit arrangement and combination. The resource unit allocation index is further used to indicate the number of multi-user multiple-input multiple-output MU-MIMO users supported in a resource unit that includes at least 106 subcarriers. The number of MU-MIMO users is greater than 8. The processing circuit is configured to determine, based on the at least one resource unit allocation subfield, the number of MU-MIMO users supported in the resource unit that includes at least 106 subcarriers.

The apparatus provided in the twenty-second aspect is configured to perform the method according to any one of the fourth aspect or the embodiments of the fourth aspect. For details, refer to the any one of the fourth aspect or the embodiments of the fourth aspect. Details are not described herein.

According to a twenty-third aspect, a communications apparatus is provided. The apparatus includes a processing circuit and a communications interface that is internally connected to and communicates with the processing circuit. The communications interface is configured to receive a physical layer protocol data unit (PPDU). The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8. The processing circuit is configured to determine, based on the at least one resource unit allocation subfield and the second indication field, the number of MU-MIMO users supported in the resource unit that includes at least 106 subcarriers.

The apparatus provided in the twenty-third aspect is configured to perform any one of the fifth aspect or the embodiments of the fifth aspect. For specific details, refer to any one of the fifth aspect or the embodiments of the fifth aspect. Details are not described herein again.

According to a twenty-fourth aspect, a communications apparatus is provided. The apparatus includes a processing circuit and a communications interface that is internally connected to and communicates with the processing circuit. The communications interface is configured to receive a physical layer protocol data unit (PPDU). The PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8. The processing circuit determines, based on the at least one resource unit allocation subfield and the at least one per station field, the number of MU-MIMO users supported in the resource unit that includes at least 106 subcarriers.

The apparatus provided in the twenty-fourth aspect is configured to perform any one of the sixth aspect or the embodiments of the sixth aspect. For specific details, refer to any one of the sixth aspect or the embodiments of the sixth aspect. Details are not described herein again.

According to a twenty-fifth aspect, a computer program product is provided. The computer program product includes a computer program, and when the computer program is executed by a processor, the method according to any one of the first aspect to the sixth aspect or the method according to any one of the embodiments of any one of the first aspect to the sixth aspect is performed.

According to a twenty-sixth aspect, a computer-readable storage medium is provided. The computer-readable storage medium stores a computer program, and when the computer program is executed, the method according to any one of the first aspect to the sixth aspect or the method according to any one of the embodiments of any one of the first aspect to the sixth aspect is performed.

According to a twenty-seventh aspect, a communications system is provided. The system includes the apparatus provided in the seventh aspect and the apparatus provided in the tenth aspect.

Alternatively, the system includes the apparatus provided in the eighth aspect and the apparatus provided in the eleventh aspect.

Alternatively, the system includes the apparatus provided in the ninth aspect and the apparatus provided in the twelfth aspect.

Alternatively, the system includes the apparatus provided in the thirteenth aspect and the apparatus provided in the sixteenth aspect.

Alternatively, the system includes the apparatus provided in the fourteenth aspect and the apparatus provided in the seventeenth aspect.

Alternatively, the system includes the apparatus provided in the fifteenth aspect and the apparatus provided in the eighteenth aspect.

Alternatively, the system includes the apparatus provided in the nineteenth aspect and the apparatus provided in the twenty-second aspect.

Alternatively, the system includes the apparatus provided in the twentieth aspect and the apparatus provided in the twenty-third aspect.

Alternatively, the system includes the apparatus provided in the twenty-first aspect and the apparatus provided in the twenty-fourth aspect.

BRIEF DESCRIPTION OF DRAWINGS

FIG. 2 is a schematic diagram of a structure of an HE MU PPDU;

FIG. 8 is a schematic diagram of a structure of a content channel when a data packet bandwidth is 20 MHz;

FIG. 9 is a schematic diagram of a structure of a content channel when a data packet bandwidth is 40 MHz;

FIG. 10 is a schematic diagram of a structure of a content channel when a data packet bandwidth is 80 MHz;

FIG. 14 is a schematic diagram of resource unit arrangement and combination manners on two CCs according to an embodiment of this application;

FIG. 15 is a schematic diagram of structures of two CCs according to an embodiment of this application;

FIG. 16 is another schematic diagram of a structure of a signal field B according to an embodiment of this application;

FIG. 17 is another schematic diagram of structures of two CCs according to an embodiment of this application;

FIG. 20 is still another schematic diagram of structures of two CCs according to an embodiment of this application;

FIG. 21 is still another schematic diagram of a structure of a signal field B according to an embodiment of this application;

FIG. 22 is still another schematic diagram of structures of two CCs according to an embodiment of this application;

DESCRIPTION OF EMBODIMENTS

The following describes technical solutions of this application with reference to the accompanying drawings.

The technical solutions of the embodiments of this application may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communications system, a future 5th generation (5G) system, or a new radio (NR) system.

The technical solutions of the embodiments of this application may be further applied to a wireless local area network (WLAN) system. For example, the embodiments of this application may be applied to 802.11ac/802.11ax/802.11be in institute of electrical and electronics engineers (IEEE) 802.11 family protocols currently used in a WLAN or any protocol in a future IEEE 802.11 family.

Figure 1:
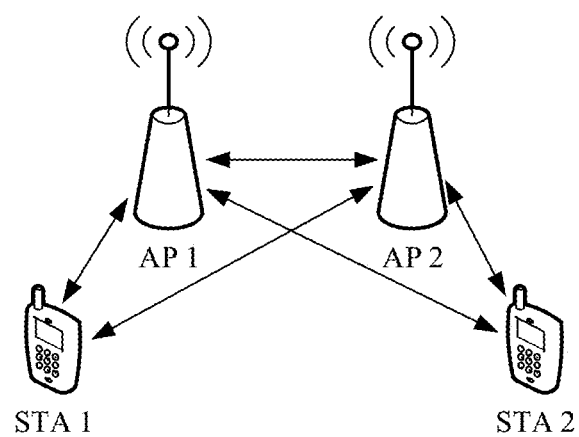
FIG. 1 is a schematic diagram of a communications system used in an embodiment of this application.

FIG. 1 is a schematic diagram of a communications system to which an embodiment of this application is applicable. The communications system shown in FIG. 1 may be a WLAN system or a wide area network system. The communications system in FIG. 1 may include one or more APs and one or more STAs. In FIG. 1, two APs (an AP 1 and an AP 2) and two user stations (stations, STAs) (a STA 1 and a STA 2) are used as an example. Wireless communication may be performed between the APs, between the AP and the STA, and between the STAs by using various standards. The solutions provided in this application may be applied to communication between the APs, communication between the STAs, and communication between the AP and the STA.

A subscriber station (STA) may also be referred to as a system, a subscriber unit, an access terminal, a mobile station, a remote station, a remote terminal, a mobile device, a user terminal, a terminal, a wireless communication device, a user agent, a user apparatus, or user equipment (UE). The station may be a wireless communication chip, a wireless sensor, or a wireless communication terminal. For example, the station is a mobile phone supporting a wireless fidelity (WiFi) communication function, a tablet computer supporting a WiFi communication function, a set-top box supporting a WiFi communication function, a smart television supporting a WiFi communication function, a smart wearable device supporting a WiFi communication function, a vehicle-mounted communication device supporting a WiFi communication function, or a computer supporting a WiFi communication function. Optionally, the station may support a device of the 802.11 standard in a current network system or a future network system.

The AP in this embodiment of this application may also be referred to as a network device. The network device may be a device configured to communicate with the STA. The network device may be a base transceiver station (BTS) in a global system for mobile communications (GSM) or code division multiple access (CDMA), a NodeB (NB) in a wideband code division multiple access (WCDMA) system, an evolved NodeB (eNB or eNodeB) in an LTE system, a wireless controller in a cloud radio access network (CRAN) scenario, a wireless access point in a WLAN/WiFi system, or the like. Alternatively, the network device may be a relay station, an access point, an in-vehicle device, a wearable device, a network device in a future 5G network, a network device in a future evolved PLMN network, or the like. This is not limited in this embodiment of this application.

In this embodiment of this application, the AP may communicate with the STA by using a wireless local area network, and data of the STA is transmitted to a network side, or data from a network side is transmitted to the STA. The AP is also referred to as a wireless access point, a hotspot, or the like. The AP is an access point used by a mobile user to access a wired network, is mainly deployed at home, inside a building or inside a campus, and has a typical coverage radius of tens of meters to hundreds of meters. Certainly, the AP may alternatively be deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a WiFi chip. Optionally, the AP may be a device that supports the 802.11 standard in the current network system or the future network system.

For example, wireless communication may be performed between the AP and the STA by using a multi-user multiple-input multiple-output (multi-users multiple-input multiple-output, MU-MIMO) technology. In this embodiment of this application, each STA is equipped with one or more antennas. Each AP supports multi-site coordinated and/or joint transmission.

It should be further understood that, FIG. 1 is merely a schematic diagram. The communications system may further include another network device or terminal device, for example, may further include a wireless relay device and a wireless backhaul device, which are not drawn in FIG. 1. The number of APs and the number of STAs included in the communications system are not limited in this embodiment of this application.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry instructions and/or data.

Cases supported in 802.11 WLAN standard versions in space domain are shown in Table 1:

TABLE 1

| | Cases supported in the 802.11 standard versions in space domain | | | |
|---|---|---|---|---|
| Standard version | 802.11a/g (non-HT) | 802.11n (HT) | 802.11ac (VHT) | 802.11 ax (HE) |
| Case supported in space domain | Single-input single output (SISO) that supports one spatial stream | Single-user multiple-input multiple-output (SU MIMO) that supports a maximum of four spatial streams | Single-user multiple-input multiple-output (SU MIMO) that supports a maximum of eight spatial streams and downlink multi-user multiple-input multiple-output (DL MU-MIMO) that supports a maximum of four users, where each user supports a maximum of four spatial streams | SU MIMO (which supports a maximum of eight streams), and DL MU-MIMO and UL MU-MIMO (which support a maximum of eight users, where each user supports a maximum of four streams) |

A name of non-high throughput (Non-HT) is used for the 802.11a/g standard. Only one spatial stream can be sent or received at a time in a single-input single-output (SISO) system. A name of high throughput (high throughput, HT) is used for the 802.11n standard. A maximum of four spatial streams are supported in a single-user multiple-input multiple-output (SU MIMO) system. A name of very high throughput (VHT) is used for the 802.11ac standard. A maximum of eight spatial streams and a maximum of four users are supported in a downlink multi-user multi-input multi-output (DL MU-MIMO) system, and each user supports a maximum of four spatial streams. A name of high efficiency (HE) is used for the 802.11ax standard. A maximum of eight spatial streams are supported in DL MU-MIMO and uplink (uplink UL) MU-MIMO, and a maximum of eight users are supported in a resource unit in which MU-MIMO is performed. Each user supports a maximum of four spatial streams. In addition, a plurality of MU-MIMO user groups are supported in a plurality of resource units in frequency domain.

MU-MIMO is further introduced into 802.11ac on the basis of SU MIMO. An access point (for example, an AP) usually includes more antennas than a station (for example, a STA). For SU MIMO transmission, a maximum number of streams supported in a system is limited by the AP or the STA that includes fewer antennas. However, in MU-MIMO, simultaneous communication between the AP and a plurality of STAs is supported, and the number of supported spatial streams is a smaller value between a sum of the numbers of spatial streams supported by the plurality of STAs and the number of spatial streams supported by the AP. A larger number of spatial streams are supported in general, and therefore a system throughput is increased.

Before the 802.11ax standard, only orthogonal frequency division multiplexing (orthogonal frequency division multiplexing, OFDM) transmission is supported in the 802.11 standard, and an entire bandwidth is allocated to one station or a group of stations for SU transmission or DL MU-MIMO transmission. In the phase of the 802.11ax standard, a new orthogonal frequency division multiple access (orthogonal frequency division multiple access, OFDMA) technology is introduced, and the entire bandwidth is divided into one or more resource units (resource units, RUs). DL OFDMA and UL OFDMA transmission are introduced into the 802.11ax standard, and there are a total of four packet formats. A high efficiency multi-user physical layer protocol data unit (high efficiency multi-user physical layer protocol data unit, HE MU PPDU) (which may also be referred to as a "data packet") is used for DL OFDMA and DL MU-MIMO transmission. A format of the data packet is shown in FIG. 2.

As shown in FIG. 2, the entire data packet is divided into a preamble part and a data field part. The preamble part includes a legacy short training field (legacy short training field, L-STF), a legacy long training field (legacy long training field, L-LT), a legacy signal field (legacy signal, L-SIG), a repeated legacy signal field (repeated legacy signal, RL-SIG), a high efficient signal field A (High Efficient Signal Field-A, HE-SIG-A), a high efficient signal field B (High Efficient Signal Field-B, HE-SIG-B), a high efficient short training field (High Efficient short training field, HE-STF), and a high efficient long training field (High Efficient long training field, HE-LTF). There is further a packet extension (packet extension, PE) field after the data field (data).

The HE-SIG-A field is used to indicate a bandwidth of the data packet, the number of symbols included in the HE-SIG-B field, a modulation and coding scheme (modulation and coding scheme, MCS) used for the HE-SIG-B field, information indicating whether the HE-SIG-B field is in a compressed mode, and the like. The HE-SIG-B field mainly includes a public field and a per user field. The public field includes information indicating how a resource unit of the entire bandwidth is allocated. The per user field includes an association identifier (association identifier, AID) of each user, an MCS, the number of spatial streams (number of spatial and time streams, NSTS), a coding scheme (Coding), information indicating whether transmit beamforming is used, and the like.

For UL OFDMA, the AP first sends a trigger frame to a plurality of STAs. The trigger frame is one of medium access control (medium access control, MAC) frames, and is used to trigger a plurality of users to perform uplink multi-user transmission. The trigger frame includes resource indication information required for uplink OFDMA transmission, including a station identifier, resource unit allocation information, and the like, and provides reference for power, time, and frequency synchronization for the plurality of STAs. After receiving the trigger frame, the plurality of STAs send a trigger-based PPDU (trigger-based, HE TB PPDU) to the AP, to perform UL OFDMA transmission. The resource indication information for UL OFDMA transmission is located in the trigger frame, and therefore a data packet structure of the HE TB PPDU does not need to be indicated in the HE TB PPDU by using an HE-SIG-B field. That is, the data packet structure of the HE TB PPDU does not include the HE-SIG-B field.

For DL OFDMA and DL MU-MIMO transmission, when a sending device sends a data packet to a receiving device, the data packet includes an HE-SIG-A field. The HE-SIG-A field indicates a symbol length of an HE-SIG-B field, an MCS of the HE-SIG-B field, a bandwidth of the entire data packet, and the like. If the bandwidth of the data packet is greater than 20 MHz, the HE-SIG-A field is duplicated for transmission on each 20-MHz channel. The data packet further includes the HE-SIG-B field, to provide resource indication information for DL MU-MIMO and DL OFDMA.

Coding is separately performed on the HE-SIG-B field on each 20-MHz channel. An information structure of the HE-SIG-B field on each 20-MHz channel is shown in FIG. 3.

Figure 3:
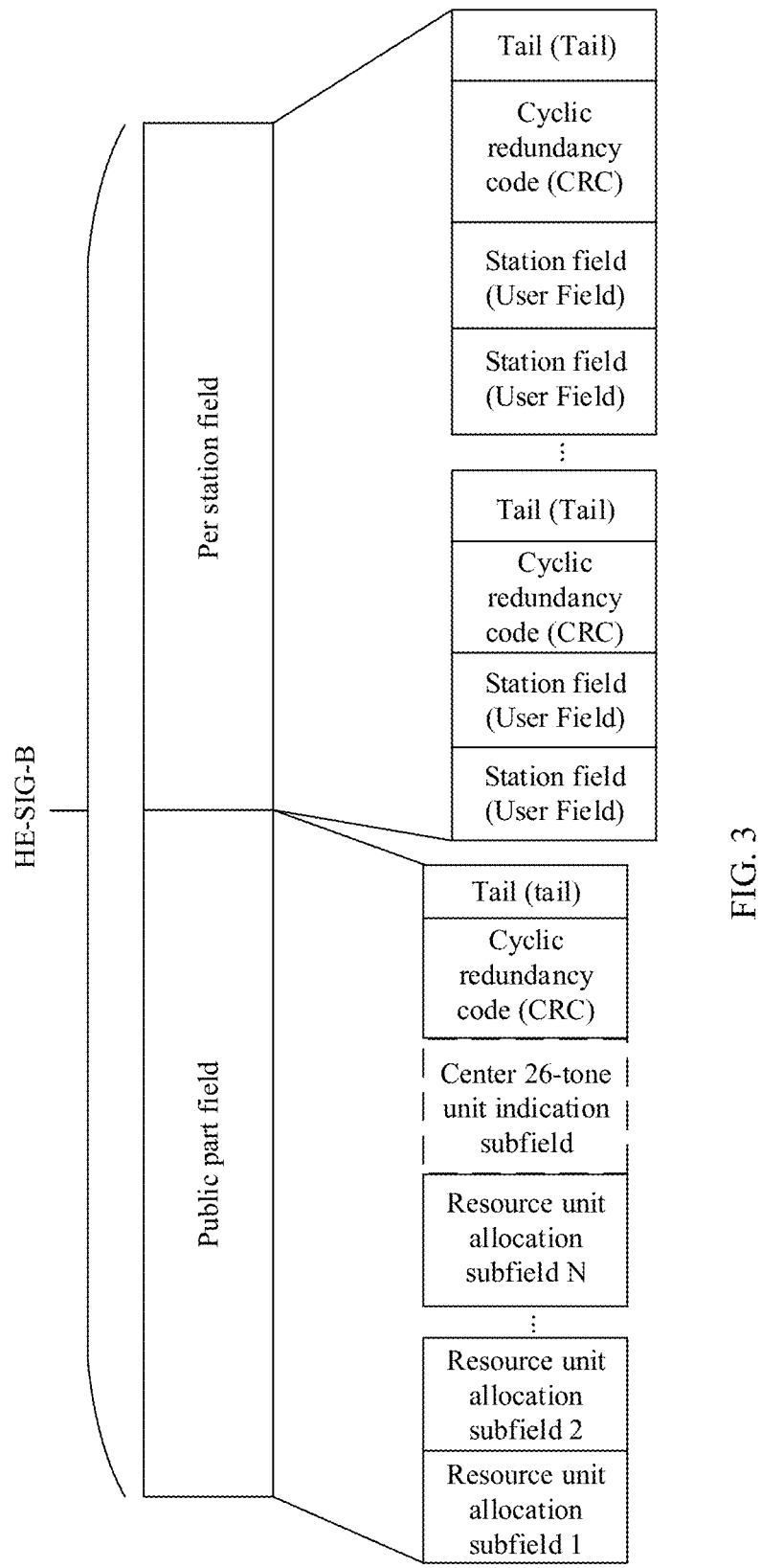
FIG. 3 is a schematic diagram of a structure of an HE-SIG-B field at 20 MHz.

As shown in FIG. 3, the HE-SIG-B field is divided into two parts. A first part is a public field (public part field), and includes 1 to N resource unit (resource unit, RU) allocation subfields (RU allocation subfields), a center 26-tone (Center 26-Tone) resource unit indication subfield (Center 26-Tone RU indication) that exists when the bandwidth is greater than or equal to 80 MHz, cyclic redundancy code (cyclic redundancy code, CRC) for check, and a tail (Tail) subfield for cyclic decoding. Each resource unit allocation subfield indicates one resource unit arrangement and combination. In a per station field (which may also be referred to as a per user field (per user field)), based on a resource unit allocation sequence, there are 1 to M station fields (user fields). Two of the M station fields are usually form a group, and there is CRC and a tail field after every two station fields. The last group is an exception, and there may be one or two station fields.

In the conventional technology, a data packet bandwidth is divided into various resource unit arrangements and combinations. A resource unit allocation subfield in an HE-SIG-B field is used to indicate the number of MU-MIMO users supported in a resource unit (106-tone RU) that includes at least 106 subcarriers, but can indicate a maximum of only eight users. In the next-generation 802.11be extremely high throughput (extremely high throughput, EHT) standard of the 802.11ax standard, the number of supported streams is expanded from eight streams in 802.11ac and 802.11ax to 16 streams. Therefore, the number of MU-MIMO users supported in the RU whose size is greater than or equal to a 106-tone RU may be further increased. For example, 16 users may be supported. However, in a current manner of indicating the number of users for MU-MIMO transmission, the resource unit allocation subfield can indicate a maximum of only eight MU-MIMO users. Consequently, there is relatively low resource utilization, and communication efficiency is seriously affected. How to indicate, during MU-MIMO transmission, a larger number of MU-MIMO users supported in the RU whose size is greater than or equal to the 106-tone RU, for example, to indicate the number of MU-MIMO users that is greater than 8, becomes a problem that needs to be currently urgently resolved.

In view of this, this application provides a method for indicating the number of MU-MIMO users. A resource unit allocation subfield is designed, or a new indication field is added, to indicate a case in which the number of users supported in an RU whose size is greater than or equal to a 106-tone tone is greater than 8. Therefore, resource utilization and communication efficiency are improved.

Figure 4:
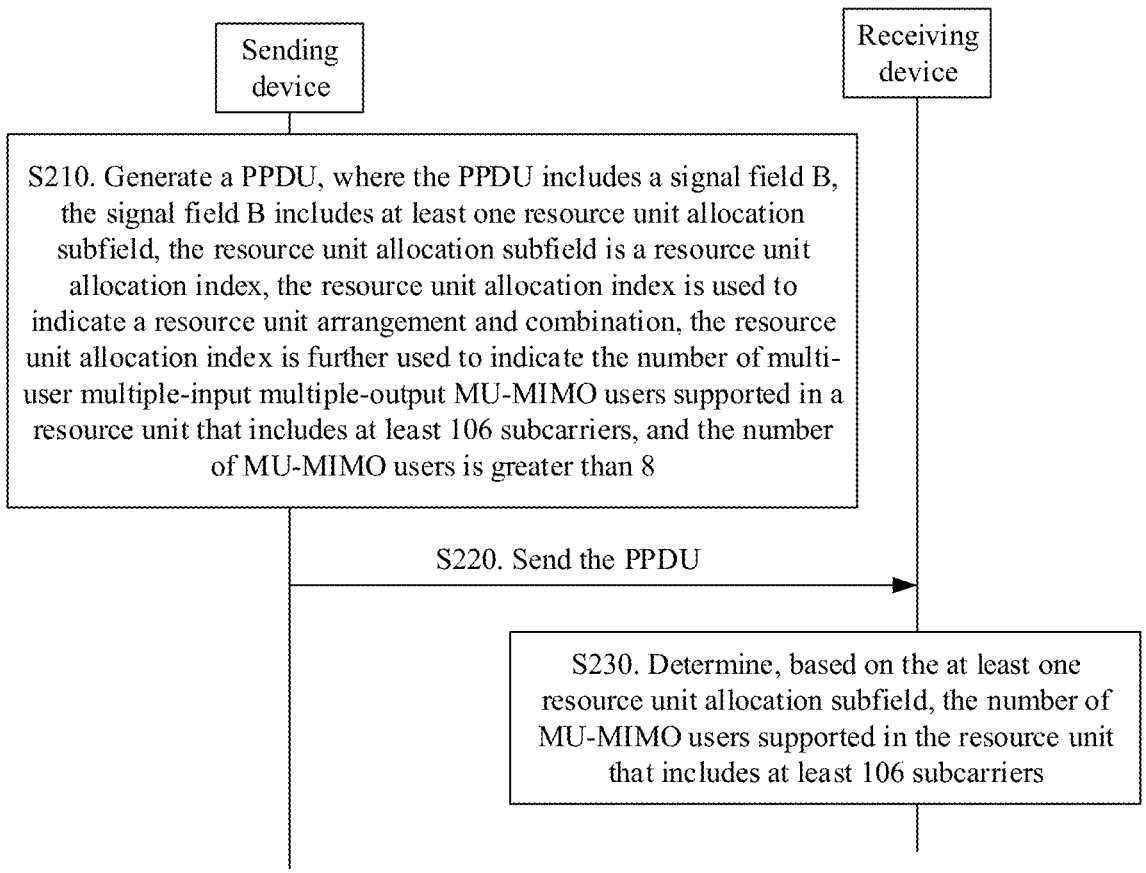
FIG. 4 is a schematic interaction diagram of a method for indicating the number of MU-MIMO users according to an embodiment of this application.

The method for indicating the number of MU-MIMO users provided in this application is described below in detail with reference to FIG. 4. FIG. 4 is a schematic flowchart of a method 200 for indicating the number of MU-MIMO users according to an embodiment of this application. The method 200 may be applied to the scenario shown in FIG. 1. Certainly, the method 200 may be applied to another communication scenario or communications system. This is not limited in this embodiment of this application.

It should be understood that in the following description, a method in each embodiment is described by using an example in which the method in each embodiment is performed by a sending device and a receiving device. The sending device may be the foregoing AP or STA, and the receiving device may also be the foregoing AP or STA. As an example instead of a limitation, the method may be alternatively performed by chips applied to the sending device and the receiving device.

As shown in the FIG. 4, the method 200 shown in FIG. 4 may include step S210 and step S220. The following describes in detail the steps in the method 200 with reference to FIG. 4. The method 200 includes the following steps.

S210. The sending device generates a PPDU, where the PPDU includes a signal field B, the signal field B includes at least one resource unit allocation subfield, the resource unit allocation subfield is a resource unit allocation index, the resource unit allocation index is used to indicate a resource unit arrangement and combination, the resource unit allocation index is further used to indicate the number of multi-user multiple-input multiple-output MU-MIMO users supported in a resource unit that includes at least 106 subcarriers, and the number of MU-MIMO users is greater than 8.

S220. The sending device sends the PPDU. Correspondingly, the receiving device receives the PPDU.

S230. The receiving device determines, based on the at least one resource unit allocation subfield, the number of MU-MIMO users supported in the resource unit that includes at least 106 subcarriers.

For example, in S210, when the sending device needs to send data to the receiving device, the sending device sends the PPDU to the receiving device. The PPDU includes the signal field (Signal Field-B, SIG-B). In addition to the signal field B, the PPDU may further include an EHT-SIG-A field, a data field, and the like. The signal field B includes the at least one resource unit allocation subfield (RU allocation subfield). The signal field B may further include at least one station field (User Field). The resource unit allocation subfield is a resource unit allocation index, and the resource unit allocation index is used to indicate a resource unit arrangement and combination (or may be referred to as a resource unit allocation sequence). A sequence of the at least one station field corresponds to the resource unit allocation sequence. A structure of each station field indicates station information of allocated STAs in an RU included in the resource unit arrangement and combination. When the resource unit arrangement and combination indicated in the resource unit allocation subfield includes the resource unit that includes at least 106 subcarriers, the resource unit allocation index is further used to indicate the number of MU-MIMO users supported in the resource unit that includes at least 106 subcarriers. The number of MU-MIMO users is greater than 8. In the following description, description is provided by using an example in which a case in which the number of MU-MIMO users is greater than 8 is a case in which the number of MU-MIMO users is 9 to 16. It may be understood that the case in which the number of MU-MIMO users is greater than 8 may further include a case in which the number of MU-MIMO users is greater than 16.

For ease of understanding S210, subcarrier distribution (Tone Plan) manners and manners of indicating the number of MU-MIMO users in the resource unit allocation subfield at different data packet bandwidths in the 802.11ax standard are first briefly described.

The subcarrier distribution (Tone Plan) manners at the different data packet bandwidths are first described.

Figure 5:
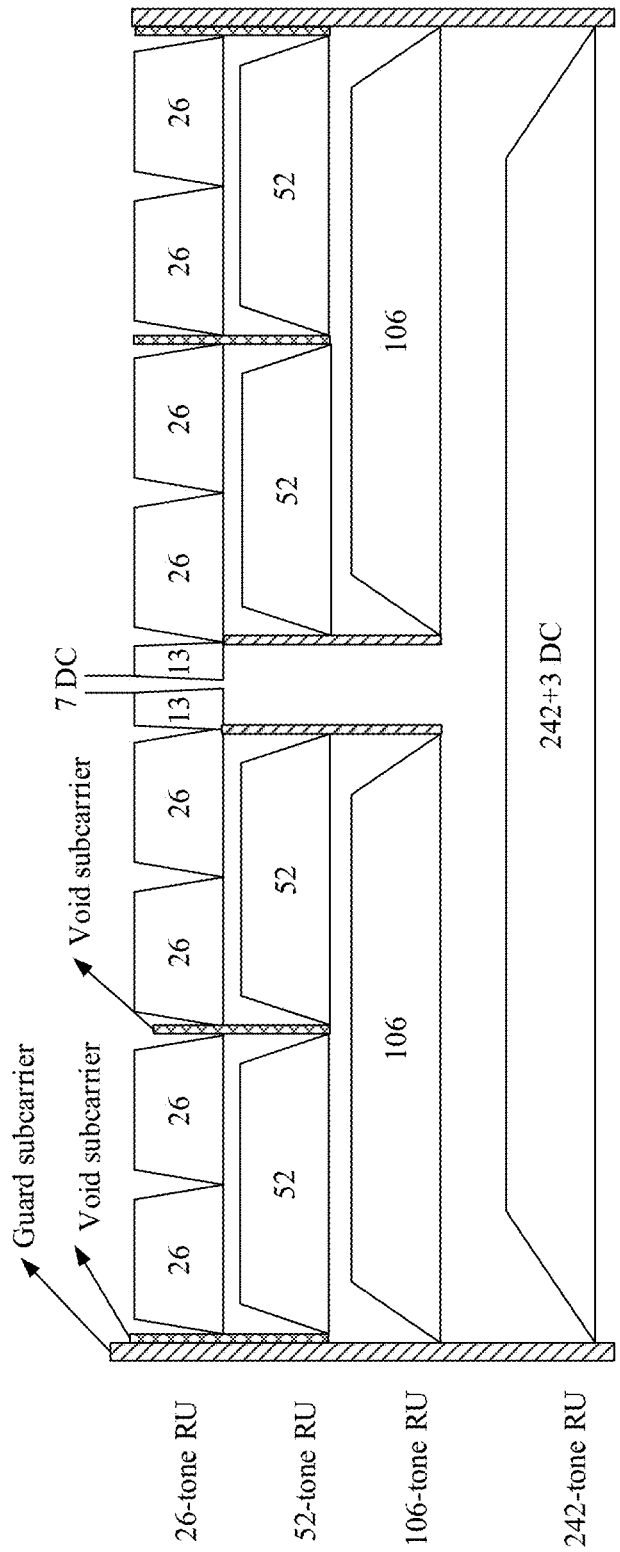
FIG. 5 is a schematic diagram of various resource unit arrangement and combination manners when a data packet bandwidth is 20 MHz.

FIG. 5 shows various resource unit arrangement and combination manners when a data packet bandwidth is 20 MHz. The entire 20-MHz bandwidth may include an entire resource unit (242-tone RU) that includes 242 subcarriers, or may include various combinations of a resource unit (26-tone RU) that includes 26 subcarriers, a resource unit (52-tone RU) that includes 52 subcarriers, and a resource unit (106-tone RU) that includes 106 subcarriers. "Tone" may be understood as a subcarrier. In addition to the RUs used to transmit data, there is further a guard subcarrier, a void subcarrier, or a direct current (DC) subcarrier.

Figure 6:
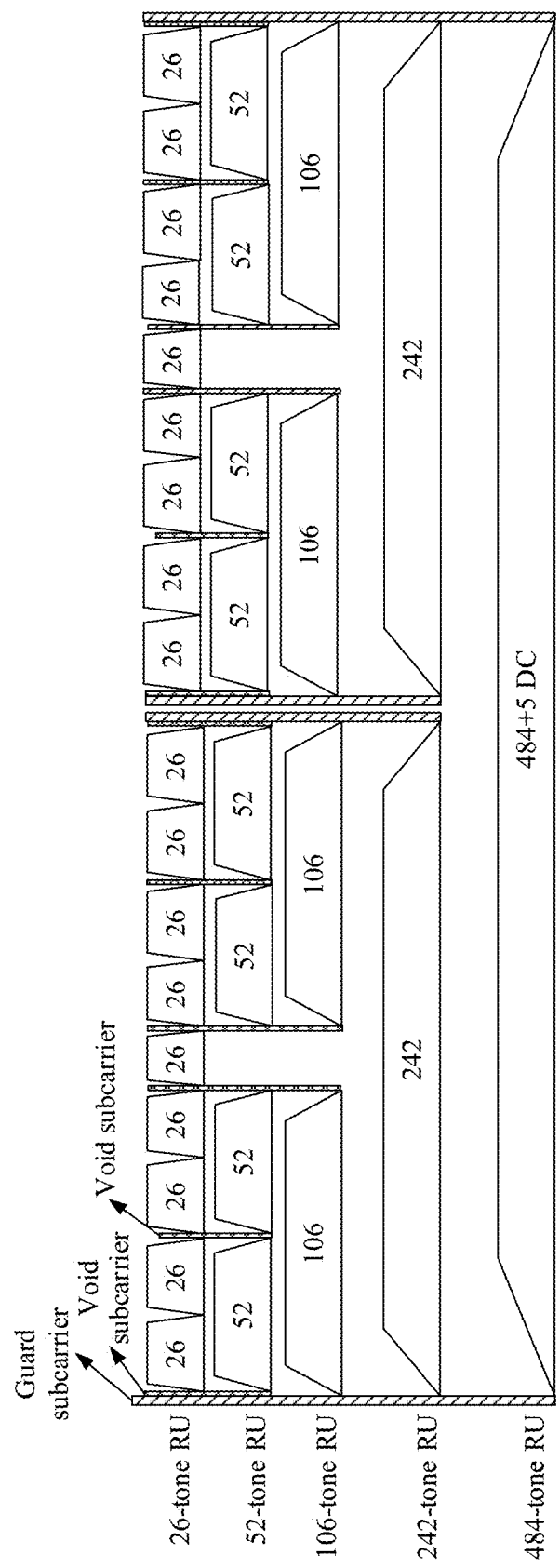
FIG. 6 is a schematic diagram of various resource unit arrangement and combination manners when a data packet bandwidth is 40 MHz.

FIG. 6 shows various resource unit arrangement and combination manners when the data packet bandwidth is 40 MHz. The entire bandwidth is roughly equivalent to a replication of the subcarrier distribution of 20 MHz. The entire 40-MHz bandwidth may include an entire resource unit (484-tone RU) that includes 484 subcarriers, or may include various combinations of a 26-tone RU, a 52-tone RU, a 106-tone RU, and a 242-tone RU.

Figure 7:
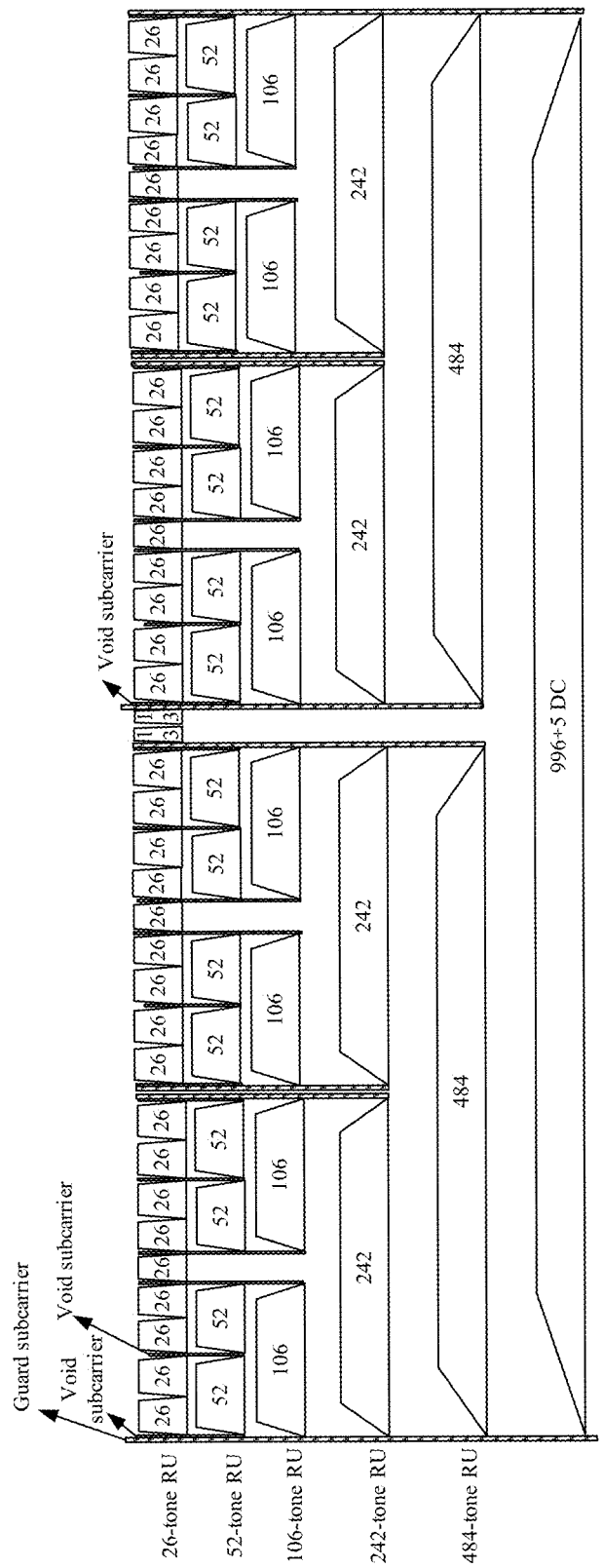
FIG. 7 is a schematic diagram of various resource unit arrangement and combination manners when a data packet bandwidth is 80 MHz.

FIG. 7 shows various resource unit arrangement and combination manners when the data packet bandwidth is 80 MHz. The entire bandwidth is roughly equivalent to a replication of the subcarrier distribution of 20 MHz. The entire 80-MHz bandwidth may include an entire resource unit (996-tone RU) that includes 996 subcarriers, or may include various combinations of a 484-tone RU, a 242-tone RU, a 106-tone RU, a 52-tone RU, and a 26-tone RU. In addition, there is a center 26-tone RU (Center 26-Tone RU) that includes two 13-tone subunits in the middle of the entire 80-MHz bandwidth.

Similarly, when the data packet bandwidth is 160 MHz, the entire bandwidth may be considered as a replication of subcarrier distribution of two 80-MHz bandwidths. The entire bandwidth may include an entire 2×996-tone RU (namely, a resource unit that includes 1992 subcarriers), or may include various combinations of a 26-tone RU, a 52-tone RU, a 106-tone RU, a 242-tone RU, a 484-tone RU, and a 996-tone RU. In addition, there is a center 26-tone RU that includes two 13-tone subunits in the middle of the entire 160 MHz bandwidth.

In the foregoing subcarrier distribution manners, on the basis of the 242-tone RU, a 242-tone RU on the left may be considered as a lowest frequency of the data packet bandwidth, and a 242-tone RU on the right may be considered as a highest frequency. FIG. 6 is used as an example. In this case, 242-tone RUs may be sequentially numbered 1, 2, 3, and 4 from left to right. For another example, when the data packet bandwidth is 160 MHz, 242-tone RUs may be sequentially numbered 1, 2, . . . , and 8 from left to right. It should be understood that in a data field, the eight 242-tone RUs are in a one-to-one correspondence with eight 20-MHz channels in ascending order of frequencies. However, because there is the center 26-tone RU, the eight 242-tone RUs and the eight 20-MHz channels are not completely overlap in frequency.

The manner of indicating the number of MU-MIMO users in the resource unit allocation subfield is described below.

A concept of content channel (content channel, CC) is introduced into 802.11ax. The content channel may be understood as content included in an HE-SIG-B field. For example, the content channel may include at least one resource unit allocation subfield (RU allocation subfield), a plurality of per station fields, CRC for check, and a tail (Tail) subfield for cyclic decoding. FIG. 8 is a schematic diagram of a structure of the content channel when the data packet bandwidth is 20 MHz. As shown in FIG. 8, when the data packet bandwidth is only 20 MHz, the HE-SIG-B field includes only one content channel, and the content channel includes one resource unit allocation subfield used to indicate a resource unit allocation indication in a range of a first 242-tone RU in a data part. The resource unit allocation subfield is a resource unit allocation index, and is used to indicate all possible resource unit arrangement and combination manners in the 242-tone RU. In addition, the index is used to indicate the number of users for performing SU/MU-MIMO transmission in an RU whose size is greater than or equal to a 106-tone RU (namely, an RU that includes at least 106 subcarriers).

For example, if the resource unit allocation subfield is an 8-bit index, all the possible resource unit arrangement and combination manners in the 242-tone RU may be indicated by using the 8-bit index. In addition, the 8-bit index is used to indicate the number of users for performing SU/MU-MIMO transmission in the RU whose size is greater than or equal to the 106-tone RU (namely, an RU that includes at least 106 subcarriers). An 8-bit resource unit index table is shown in Table 2.

TABLE 2

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | | 26 | 26 | 26 | 26 | 26 | 26 | | 1 |
| 00001001 | 52 | | 26 | 26 | 26 | 26 | 26 | 52 | | 1 |
| 00001010 | 52 | | 26 | 26 | 26 | 52 | 26 | 26 | | 1 |
| 00001011 | 52 | | 26 | 26 | 26 | 52 | 52 | | | 1 |
| 00001100 | 52 | | 52 | 26 | 26 | 26 | 26 | 26 | | 1 |
| 00001101 | 52 | | 52 | 26 | 26 | 26 | 52 | | | 1 |
| 00001110 | 52 | | 52 | 26 | 52 | 26 | 26 | | | 1 |
| 00001111 | 52 | | 52 | 26 | 52 | 52 | | | | 1 |
| 0001 0$y_2y_1y_0$ | 52 | | 52 | — | | 106 | | | | 8 |
| 0001 1$y_2y_1y_0$ | | 106 | | — | | 52 | 52 | | | 8 |
| 0010 0$y_2y_1y_0$ | 26 | 26 | 26 | 26 | 26 | 106 | | | | 8 |
| 0010 1$y_2y_1y_0$ | 26 | 26 | 52 | 26 | | 106 | | | | 8 |
| 0011 0$y_2y_1y_0$ | 52 | | 26 | 26 | 26 | 106 | | | | 8 |
| 0011 1$y_2y_1y_0$ | 52 | | 52 | 26 | | 106 | | | | 8 |
| 0100 0$y_2y_1y_0$ | | 106 | | 26 | 26 | 26 | 26 | 26 | | 8 |
| 0100 1$y_2y_1y_0$ | | 106 | | 26 | 26 | 26 | 52 | | | 8 |
| 0101 0$y_2y_1y_0$ | | 106 | | 26 | 52 | 26 | 26 | | | 8 |
| 0101 1$y_2y_1y_0$ | | 106 | | 26 | 52 | 52 | | | | 8 |
| 0110 $y_1y_0z_1z_0$ | | 106 (1-4) | | — | | 106 (1-4) | | | | 16 |
| 01110000 | | 52 | | 52 | — | | 52 | 52 | | 1 |
| 01110001 | | 242-tone RU empty (242-tone RU empty) | | | | | | | | 1 |
| 01110010 | | 484-tone RU with zero user fields indicated in this resource unit allocation subfield of the HE-SIG-B content channel (484-tone RU with zero user fields indicated in this RU allocation subfield of the HE-SIG-B content channel) | | | | | | | | 1 |
| 01110011 | | 996-tone RU with zero user fields indicated in this resource unit allocation subfield of the HE-SIG-B content channel (996-tone RU with zero user fields indicated in this RU allocation subfield of the HE-SIG-B content channel) | | | | | | | | 1 |
| 011101$x_1x_0$ | | Reserved (reserved) | | | | | | | | 4 |
| 01111$y_2y_1y_0$ | | Reserved (reserved) | | | | | | | | 4 |

TABLE 2-continued

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 10$y_2y_1y_0z_2z_1z_0$ | | 106 | | | 26 | | 106 | | | 64 |
| 11000$y_2y_1y_0$ | | | | 242 | | | | | | 8 |
| 11001$y_2y_1y_0$ | | | | 484 | | | | | | 8 |
| 11010$y_2y_1y_0$ | | | | 996 | | | | | | 8 |
| 11011$y_2y_1y_0$ | | Reserved (reserved) | | | | | | | | 8 |
| 111$x_4x_3x_2x_1x_0$ | | Reserved (reserved) | | | | | | | | 32 |

In Table 2, the first column represents the 8-bit index, and the middle columns #1 to #9 represent different resource unit arrangements and combinations. A number in the table represents the number of subcarriers included in the resource unit. For example, the index 00111$y_2y_1y_0$ represents that the entire 242-tone RU is divided into four RUs: a 52-tone RU, a 52-tone RU, a 26-tone RU, and a 106-tone RU. The number of entries in the third column indicates the number of entries allocated to a same resource unit, namely, the number of different indexes corresponding to a same resource unit arrangement manner. There are eight entries for the index 00111$y_2y_1y_0$. This is because when the resource unit arrangement and combination of the 242-tone RU is indicated, $y_2y_1y_0$ is further used to indicate the number of users for performing SU/MU-MIMO transmission included in the 106-tone RU, and corresponds to one to eight users. That is, 3 bits, namely, $y_2y_1y_0$, are used to indicate the one to eight users supported in the 106-tone RU. The eight entries may be considered as eight independent rows in the table. The eight rows correspond to a same resource unit arrangement and combination, and each row corresponds to a different number of users supported in the 106-tone RU. In the 802.11ax standard, it is specified that MU-MIMO may be performed in an RU that includes at least 106 subcarriers. Therefore, when there is an RU that includes at least 106 subcarriers in a row in Table 2, the number of entries is greater than 1. In addition, for the index 10$y_2y_1y_0z_2z_1z_0$, there are two 106-tone RUs. Therefore, there are a total of 8×8=64 combinations, which correspond to 64 independent rows in the table. If a center 26-tone RU is marked with "-", it indicates that no user is carried in the center 26-tone RU. For example, for the index 0110$y_1y_0z_1z_0$, a center 26-tone RU is marked with "-", which indicates that no user is carried in the center 26-tone RU. Due to an insufficient number of entries, it is currently specified that each 106-tone RU supports a maximum of four users in this special case. Therefore, there are a total of 16 entries. Correspondingly, station information of allocated STAs in a range of the 242-tone RU is indicated in the per station field based on a resource allocation sequence.

If the data packet bandwidth is greater than 20 MHz, the resource unit allocation subfield may further indicate a resource unit whose size is greater than a 242-tone RU, for example, a 484-tone RU or a 996-tone RU, indicating that a larger resource unit that includes the 242-tone RU is allocated to a STA. Similarly, for these RUs whose size is greater than the 242-tone RU, the number of users in each of the RUs is indicated by using a different index. Correspondingly, station information of allocated STAs in a range of the 242-tone RU is indicated in the per station field based on a resource allocation sequence.

FIG. 9 is a schematic diagram of a structure of the content channel when the data packet bandwidth is 40 MHz. As shown in FIG. 9, when the data packet bandwidth is 40 MHz, there are two HE-SIG-B content channels: a CC 1 and a CC 2. A first HE-SIG-B channel, namely, the CC 1, includes a resource unit allocation subfield and a corresponding per station field in a range of a first 242-tone RU. A second HE-SIG-B channel, namely, the CC 2, includes a resource unit allocation subfield and a corresponding per station field in a range of a second 242-tone RU.

FIG. 10 is a schematic diagram of a structure of the content channel when the data packet bandwidth is 80 MHz. As shown in FIG. 10, when the data packet bandwidth is 80 MHz, there are still two CCs, and there are a total of four channels. Therefore, resource unit allocation information is indicated on the four channels based on a structure of a CC 1, a CC 2, a CC 1, and a CC 2 in ascending order of frequencies. The CC 1 includes resource unit allocation subfields in ranges of a first 242-tone RU and a third 242-tone RU and a corresponding per station field in the ranges of the first 242-tone RU and the third 242-tone RU. The CC 2 includes resource unit allocation subfields in ranges of a second 242-tone RU and a fourth 242-tone RU and a corresponding per station field in the ranges of the second 242-tone RU and the fourth 242-tone RU. In addition, each of the two CCs includes a center 26-tone RU indication field corresponding to 80 MHz, to indicate whether the resource unit is used to transmit data.

Similarly, when the data packet bandwidth is 160 MHz, there are still two CCs, and there are a total of eight channels. This is equivalent to performing further expansion on the basis of 80 MHz.

In the following description, description is separately provided by using an example in which the resource unit allocation subfield is a 9-bit resource unit allocation index and an example in which the resource unit allocation subfield is an 8-bit resource unit allocation index. It should be understood that the resource unit allocation index may include more bits, for example, 10 bits or 20 bits. A manner of indicating, by the resource unit allocation index that includes more bits, the case in which the number of MU-MIMO users supported in the RU whose size is greater than or equal to the 106-tone RU is greater than 8 is similar to that of indicating, by each of the 9-bit resource unit allocation index and the 8-bit resource unit allocation index, the case in which the number of MU-MIMO users supported in the RU whose size is greater than or equal to the 106-tone RU is greater than 8.

In an embodiment, the resource unit allocation subfield may be a 9-bit resource unit allocation index. The 9-bit resource unit index may include any one or more of the following entries:

When the resource unit arrangement and combination includes only one RU whose size is greater than or equal to the 106-tone RU, an indication indicating that the RU whose size is greater than or equal to the 106-tone RU supports nine to 16 MU-MIMO users is added, and therefore 104 new entries need to be added.

A new indication indicating that the 2×996-tone RU (corresponding to 160 MHz) supports one to 16 MU-MIMO users is added, and therefore 16 new entries need to be added.

A new indication indicating that a 4×996-tone RU (corresponding to 320 MHz) supports one to 16 MU-MIMO users is added, and therefore 16 new entries need to be added.

When the resource unit arrangement and combination is 106-tone RU+26-tone RU+106-tone RU, on the basis that each 106-tone RU supports one to eight MU-MIMO users, cases in which the first 106-tone RU supports one to eight MU-MIMO users, and the second 106-tone RU supports nine to 16 MU-MIMO users; the first 106-tone RU supports nine to 16 MU-MIMO users, and the second 106-tone RU supports nine to 16 MU-MIMO users; and the first 106-tone RU supports nine to 16 MU-MIMO users, and the second 106-tone RU supports one to eight MU-MIMO users are further added, and therefore 192 new entries need to be added. To indicate that the RU whose size is greater than or equal to the 106-tone RU supports nine to 16 MU-MIMO users, a total of 328 entries need to be added in the foregoing cases.

There are a total of 512 entries (512 rows) in a 9-bit resource unit index table. The 512 entries include an entry used to indicate that the RU whose size is greater than or equal to the 106-tone RU supports one to eight MU-MIMO users and an entry used to indicate that the resource unit arrangement and combination includes no RU whose size is greater than or equal to the 106-tone RU. The number of remaining entries other than the entries used to indicate the two cases is less than 328, which is not enough to carry the 328 new entries to be added. Therefore, further, resource unit arrangements and combinations indicated by some indexes in the 9-bit resource unit index table may be changed, and these indexes may be used to indicate some new entries to be added. Alternatively, the number of entries that need to be added may be reduced. Alternatively, a reserved entry is used to indicate the case in which the number of MU-MIMO users supported in the RU whose size is greater than or equal to the 106-tone RU is greater than 8. For example, in a full-bandwidth scenario (for example, when the data packet bandwidth is 320 MHz), no RU allocation is performed. That is, the number of entries in the foregoing third case (namely, a case in which the number of MU-MIMO users in the 4*996-tone RU is indicated) does not need to be newly added, and a reduction of 16 entries may be achieved.

For another example, all entries in which a center 26-tone RU is marked with "-", namely, entries in which the center 26-tone RU is empty, are redefined to indicate the new entries that need to be added, and a total of about 32 new entries may be added.

For another example, a maximum number of MU-MIMO users that can be supported in each 106-tone RU when resource allocation is 106-tone RU+26-tone RU+106-tone RU is limited, for example, still limited to a maximum number of eight MU-MIMO users. In this case, the 192 new entries to be added in the foregoing fourth case do not need to be added. For another example, a maximum number of MU-MIMO users that can be supported in each 106-tone RU is limited to 12 MU-MIMO users. In this case, cases in which the first 106-tone RU supports one to eight MU-MIMO users, and the second 106-tone RU supports nine to 12 MU-MIMO users (32 new entries need to be added); the first 106-tone RU supports nine to 12 MU-MIMO users, and the second 106-tone RU supports nine to 12 MU-MIMO users (16 new entries need to be added); and the first 106-tone RU supports nine to 12 MU-MIMO users, and the second 106-tone RU supports one to eight MU-MIMO users (32 new entries need to be added) are further added. In this case, a total of 80 new entries need to be added.

For another example, reserved entries such as $0011101x_1x_0$ and $001111y_2y_1y_0$ may be further used for indication.

Table 3 shows an example of the 9-bit resource allocation index table.

TABLE 3

| 9-bit index (B8 B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 000000000 | 26 | 26 | 26 | 26 | 26 | 26 | 26 | 26 | 26 | 1 |
| 000000001 | 26 | 26 | 26 | 26 | 26 | 26 | 26 | 52 | | 1 |
| 000000010 | 26 | 26 | 26 | 26 | 26 | 52 | | 26 | 26 | 1 |
| 000000011 | 26 | 26 | 26 | 26 | 26 | 52 | | 52 | | 1 |
| 000000100 | 26 | 26 | 52 | | 26 | 26 | 26 | 26 | 26 | 1 |
| 000000101 | 26 | 26 | 52 | | 26 | 26 | 26 | 52 | | 1 |
| 000000110 | 26 | 26 | 52 | | 26 | 52 | | 26 | 26 | 1 |
| 000000111 | 26 | 26 | 52 | | 26 | 52 | | 52 | | 1 |
| 000001000 | 52 | | 26 | 26 | 26 | 26 | 26 | 26 | 26 | 1 |
| 000001001 | 52 | | 26 | 26 | 26 | 26 | 26 | 52 | | 1 |
| 000001010 | 52 | | 26 | 26 | 26 | 52 | | 26 | 26 | 1 |
| 000001011 | 52 | | 26 | 26 | 26 | 52 | | 52 | | 1 |
| 000001100 | 52 | | 52 | | 26 | 26 | 26 | 26 | 26 | 1 |
| 000001101 | 52 | | 52 | | 26 | 26 | 26 | 52 | | 1 |
| 000001110 | 52 | | 52 | | 26 | 52 | | 26 | 26 | 1 |
| 000001111 | 52 | | 52 | | 26 | 52 | | 52 | | 1 |
| 000010$y_2y_1y_0$ | 52 | | 52 | | — | 106 (1-8) | | | | 8 |
| 000011$y_2y_1y_0$ | | 106 | | | — | 52 | | 52 | | 8 |
| 000100$y_2y_1y_0$ | 26 | 26 | 26 | 26 | 26 | 106 (1-8) | | | | 8 |
| 000101$y_2y_1y_0$ | 26 | 26 | 52 | | 26 | 106 (1-8) | | | | 8 |
| 000110$y_2y_1y_0$ | 52 | | 26 | 26 | 26 | 106 (1-8) | | | | 8 |
| 000111$y_2y_1y_0$ | 52 | | 52 | | 26 | 106 (1-8) | | | | 8 |
| 001000$y_2y_1y_0$ | 106 (1-8) | | | 26 | 26 | 26 | 26 | 26 | | 8 |
| 001001$y_2y_1y_0$ | 106 (1-8) | | | 26 | 26 | 26 | | 52 | | 8 |
| 001010$y_2y_1y_0$ | 106 (1-8) | | | 26 | 52 | | 26 | 26 | | 8 |
| 001011$y_2y_1y_0$ | 106 (1-8) | | | 26 | 52 | | 52 | | | 8 |
| 00110$y_1y_0z_1z_0$ | 106 (1-4) | | | — | 106 (1-4) | | | | | 16 |
| 001110000 | 52 | | 52 | | — | 52 | | 52 | | 1 |
| 001110001 | 242-tone RU empty (242-tone RU empty) | | | | | | | | | 1 |
| 001110010 | 484-tone RU with zero user fields indicated in this resource unit allocation subfield of the HE-SIG-B content channel (484-tone RU with zero user fields indicated in this RU allocation subfield of the HE-SIG-B content channel) | | | | | | | | | 1 |
| 001110011 | 996-tone RU with zero user fields indicated in this resource unit allocation subfield of the HE-SIG-B content channel (996-tone RU with zero user fields indicated in this RU allocation subfield of the HE-SIG-B content channel) | | | | | | | | | 1 |
| 0011101$x_1x_0$ | Reserved (reserved) | | | | | | | | | 4 |
| 001111$y_2y_1y_0$ | Reserved (reserved) | | | | | | | | | 4 |
| 010$y_2y_1y_0z_2z_1z_0$ | 106 (1-8) | | | 26 | 106 (1-8) | | | | | 64 |
| 011000$y_2y_1y_0$ | 242 (1-8) | | | | | | | | | 8 |
| 011001$y_2y_1y_0$ | 484 (1-8) | | | | | | | | | 8 |
| 011010$y_2y_1y_0$ | 996 (1-8) | | | | | | | | | 8 |
| 011011$y_2y_1y_0$ | 242 (9-16) | | | | | | | | | 8 |
| 011100$y_2y_1y_0$ | 484 (9-16) | | | | | | | | | 8 |
| 011111$y_2y_1y_0$ | 996 (9-16) | | | | | | | | | 8 |
| 01111$y_3y_2y_1y_0$ | 2x996 (1-16) | | | | | | | | | 16 |
| 10000$y_3y_2y_1y_0$ | 106 (1-8) | | | 26 | 106 (9-10) | | | | | 16 |
| 100010$y_2y_1y_0$ | 52 | | 52 | | — | 106 (9-16) | | | | 8 |
| 100011$y_2y_1y_0$ | 106 (9-16) | | | | — | 52 | | 52 | | 8 |
| 100100$y_2y_1y_0$ | 26 | 26 | 26 | 26 | 26 | 106 (9-16) | | | | 8 |
| 100101$y_2y_1y_0$ | 26 | 26 | 52 | | 26 | 106 (9-16) | | | | 8 |
| 100110$y_2y_1y_0$ | 52 | | 26 | 26 | 26 | 106 (9-16) | | | | 8 |
| 100111$y_2y_1y_0$ | 52 | | 52 | | 26 | 106 (9-16) | | | | 8 |
| 101000$y_2y_1y_0$ | 106 (9-16) | | | 26 | 26 | 26 | 26 | 26 | | 8 |
| 101001$y_2y_1y_0$ | 106 (9-16) | | | 26 | 26 | 26 | | 52 | | 8 |
| 101010$y_2y_1y_0$ | 106 (9-16) | | | 26 | 52 | | 26 | 26 | | 8 |
| 101011$y_2y_1y_0$ | 106 (9-16) | | | 26 | 52 | | 52 | | | 8 |
| 10110$y_1y_0z_1z_0$ | 106 | | | — | 106 | | | | | 16 |
| 10111$y_3y_2y_1y_0$ | 106 (9-16) | | | 26 | 106 (11-12) | | | | | 16 |
| 110$y_2y_1y_0z_2z_1z_0$ | 106 (9-16) | | | 26 | 106 (9-16) | | | | | 64 |
| 1110$y_4y_3y_2y_1y_0$ | 106 (1-8) | | | 26 | 106 (13-16) | | | | | 32 |
| 11110$y_3y_2y_1y_0$ | 106 (9-16) | | | 26 | 106 (1-2) | | | | | 16 |
| 11111$x_3x_2x_1x_0$ | 4x996 (1-16) | | | | | | | | | 16 |

In the example shown in Table 3, newly added entries are as follows: When the resource unit arrangement and combination includes only one RU whose size is greater than or equal to the 106-tone RU, an entry indicating that the RU whose size is greater than or equal to the 106-tone RU supports nine to 16 MU-MIMO users is added. In addition, an entry indicating that the 2×996-tone RU (corresponding to 160 MHz) supports one to 16 MU-MIMO users is added. A new entry indicating that the 4×996-tone RU (corresponding to 320 MHz) supports one to 16 MU-MIMO users is added. The maximum number of MU-MIMO users that can be supported in the 106-tone RU when resource allocation is 106-tone RU+26-tone RU+106-tone RU is limited. For example, the 106-tone RU supports 13 to 16 MU-MIMO users, or the 106-tone RU supports 11 to 12 MU-MIMO users. It may be learned that the 9-bit resource unit index may be used to indicate the number of MU-MIMO users supported in the resource unit that includes at least 106 subcarriers. The number of MU-MIMO users may be greater than 8.

In another possible implementation, the resource unit allocation subfield may be an 8-bit resource unit allocation index. One or more of the foregoing 328 entries may be newly added to the 8-bit resource unit index.

There are a total of 256 entries (256 rows) in an 8-bit resource unit index table, which is not enough to carry the 328 new entries to be added. Therefore, further, resource unit arrangements and combinations indicated by some indexes in the 8-bit resource unit index table may be changed, and these indexes may be used to indicate some new entries to be added. Alternatively, the number of entries that need to be added may be reduced. Alternatively, a reserved entry is used to indicate the case in which the number of MU-MIMO users supported in the RU whose size is greater than or equal to the 106-tone RU is greater than 8. For example, the number of MU-MIMO users supported in only an RU whose size is greater than or equal to a 242-tone RU is greater than 8, and the 106-tone RU still supports a maximum of eight MU-MIMO users. In this case, the 8-bit index table may be used for indication. Table 4 shows an example of the 8-bit resource allocation index table. In the example shown in Table 4, there is a limitation that the number of MU-MIMO users supported in only the RU whose size is greater than or equal to the 242-tone RU is greater than 8, and the 106-tone RU still supports a maximum of eight users, to indicate a case in which the number of MU-MIMO users supported in the RU whose size is greater than or equal to the 242-tone RU is greater than 8.

TABLE 4

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | 106 (1-8) | | | | 8 |
| 00011$y_2y_1y_0$ | | 106 | | | — | 52 | | 52 | | 8 |

TABLE 4-continued

| 8-bit index (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00100$y_2y_1y_0$ | 26 | 26 | 26 | 26 | 26 | | 106 (1-8) | | | 8 |
| 00101$y_2y_1y_0$ | 26 | 26 | | 52 | 26 | | 106 (1-8) | | | 8 |
| 00110$y_2y_1y_0$ | | 52 | 26 | 26 | 26 | | 106 (1-8) | | | 8 |
| 00111$y_2y_1y_0$ | | 52 | | 52 | 26 | | 106 (1-8) | | | 8 |
| 01000$y_2y_1y_0$ | | 106 (1-8) | | | 26 | 26 | 26 | 26 | 26 | 8 |
| 01001$y_2y_1y_0$ | | 106 (1-8) | | | 26 | 26 | 26 | | 52 | 8 |
| 01010$y_2y_1y_0$ | | 106 (1-8) | | | 26 | 52 | | 26 | 26 | 8 |
| 01011$y_2y_1y_0$ | | 106 (1-8) | | | 26 | 52 | | | 52 | 8 |
| 0110$y_1y_0z_1z_0$ | | 106 (1-4) | | | — | | 106 (1-4) | | | 16 |
| 01110000 | | 52 | | 52 | — | 52 | | | 52 | 1 |
| 01110001 | | | | 242-tone RU empty (242-tone RU empty) | | | | | | 1 |
| 01110010 | | | | 484-tone RU with zero user fields indicated in this resource unit allocation subfield of the HE-SIG-B content channel (484-tone RU with zero user fields indicated in this RU allocation subfield of the HE-SIG-B content channel) | | | | | | | 1 |
| 01110011 | | | | 996-tone RU with zero user fields indicated in this resource unit allocation subfield of the HE-SIG-B content channel (996-tone RU with zero user fields indicated in this RU allocation subfield of the HE-SIG-B content channel) | | | | | | | 1 |
| 011101$x_1x_0$ | | | | Reserved (reserved) | | | | | | 4 |
| 01111$y_2y_1y_0$ | | | | Reserved (reserved) | | | | | | 4 |
| 10$y_2y_1y_0z_2z_1z_0$ | | 106 | | | 26 | | 106 | | | 64 |
| 11000$y_2y_1y_0$ | | | | 242 (1-8) | | | | | | 8 |
| 11001$y_2y_1y_0$ | | | | 484 (1-8) | | | | | | 8 |
| 11010$y_2y_1y_0$ | | | | 996 (1-8) | | | | | | 8 |
| 11011$y_2y_1y_0$ | | | | 242 (9-16) | | | | | | 8 |
| 11100$y_2y_1y_0$ | | | | 484 (9-16) | | | | | | 8 |
| 11101$y_2y_1y_0$ | | | | 996 (9-16) | | | | | | 8 |
| 1111$y_3y_2y_1y_0$ | | | | 2x996 (1-16) | | | | | | 16 |

It should be understood that Table 3 and Table 4 are merely examples, and impose no limitation on the resource unit index table. For example, the entries in Table 3 and Table 4 may be sorted in any sequence, and do not need to be strictly indicated in a sequence in Table 3 and Table 4. In addition, there may be some of the entries that need to be added and original entries in the 802.11ax standard. This is not limited in this application.

In S220, the sending device sends the PPDU to the receiving device. The PPDU includes the at least one resource unit allocation subfield. For example, the resource unit allocation index indicated in the resource unit allocation subfield may be any index in Table 3 or Table 4.

In S230, the receiving device determines RU allocation based on the at least one resource unit allocation subfield included in the PPDU and the resource unit allocation index corresponding to the resource unit allocation subfield, determines, based on the resource unit allocation index, the number of MU-MIMO users supported in each RU whose size is greater than or equal to the 106-tone RU, further reads the per station field based on a predetermined sequence indicated in the resource unit allocation subfield, and determines a per station field corresponding to the receiving device, a resource unit to which the receiving device belongs, the corresponding number of spatial streams, a modulation and coding scheme, and the like based on a station identifier carried in the per station field. For example, it is assumed that the resource unit allocation index indicated in the resource unit allocation subfield received by the receiving device is 110111010. In this case, the receiving device may determine, based on the resource unit allocation index, that an RU allocation manner is 106-tone RU+26-tone RU+106-tone RU. The three bits 111 in the middle of the resource unit allocation index are used to indicate that the first 106-tone RU supports eight MU-MIMO users, and the last three bits 010 are used to indicate a difference between the number of MU-MIMO users supported in the second 106-tone RU and 8. The three bits "010" may indicate 3, that is, the difference between the number of MU-MIMO users supported in the second 106-tone RU and 8 is 3, and the second 106-tone RU supports 11 MU-MIMO users. In this case, a total of 20 MU-MIMO users are supported in the RU allocation manner 106-tone RU+26-tone RU+106-tone RU. The first 106-tone RU supports eight MU-MIMO users, the middle 26-tone RU supports one MU-MIMO user, and the second 106-tone RU supports 11 MU-MIMOO users.

According to the method for indicating the number of MU-MIMO users provided in this application, the resource unit allocation index is designed, so that the resource unit allocation index may indicate the case in which the number of users supported in the RU whose size is greater than or equal to the 106-tone RU is greater than 8. The existing signal field B is slightly changed, and this is easy to implement. Therefore, resource utilization and communication efficiency are improved.

In some embodiments, the resource unit allocation index includes a first index and a second index that are used to indicate a same resource unit arrangement and combination. The first index indicates the number of MU-MIMO users supported in the resource unit that includes at least 106 subcarriers. The number of MU-MIMO users is less than or equal to 8. The second index indicates the number of MU-MIMO users supported in the resource unit that includes at least 106 subcarriers. The number of MU-MIMO users is greater than 8.

Specifically, for example, the resource unit allocation index is an 8-bit index or a 9-bit index. In the example shown in Table 3 or Table 4, it may be learned that a same resource unit arrangement and combination corresponds to different resource unit allocation indexes. For example, in Table 3, there are two different resource unit allocation indexes for the resource unit arrangement and combination 106-tone RU+26-tone RU+26-tone RU+26-tone RU+26-tone RU+26-tone RU. A first index (first index) is 001000$y_2y_1y_0$, and indicates that the number of MU-MIMO users supported in the 106-tone RU is 1 to 8. A second index (second index) is 101000$y_2y_1y_0$, and indicates that the number of MU-MIMO users supported in the 106-tone RU is 9 to 16. In the first index, $y_2y_1y_0$ is used to indicate that the number of MU-MIMO users supported in the 106-tone RU is any one of 1 to 8. In the second index, $y_2y_1y_0$ is used to indicate that the number of MU-MIMO users supported in the 106-tone RU is any one of 9 to 16. In an embodiment, different indexes corresponding to the same resource unit arrangement and combination may be predefined or preconfigured. If a most significant bit is 0, it indicates that the number that is indicated by three bits in the index and that is of MU-MIMO users supported in the RU whose size is greater than or equal to the 106 RU is less than or equal to 8. If the most significant bit is 1, it indicates that the number of MU-MIMO users that is indicated by three bits in the index is a value obtained by subtracting 8 from an actual number of MU-MIMO users. That is, the number that is indicated by the index whose most significant bit is 1 and that is of MU-MIMO users supported in the RU whose size is greater than or equal to the 106-tone RU is greater than 8. After receiving a specific resource unit allocation index, the receiving device may determine, based on the preconfigured or predefined resource unit allocation indexes, that the number that is indicated by the resource unit allocation index and that is of MU-MIMO users supported in the RU whose size is greater than or equal to the 106-tone RU is less than or equal to 8 or is a value greater than 8. If the number that is actually indicated by the resource unit allocation index and that is of MU-MIMO users supported in the RU whose size is greater than or equal to the 106-tone RU is a value greater than 8, the receiving device may obtain, by increasing the number of MU-MIMO users that is actually indicated by the resource unit allocation index by 8, the number of MU-MIMO users actually supported in the RU whose size is greater than or equal to the 106-tone RU. Alternatively, a bit in the 8-bit or 9-bit resource unit index may be predefined or preconfigured as an indication bit. The indication bit is used to indicate that the number that is indicated by the resource unit index and that is of MU-MIMO users supported in the RU whose size is greater than or equal to the 106-tone RU is the number of MU-MIMO users actually supported in the RU or a value obtained by subtracting 8 from the number of MU-MIMO users actually supported in the RU. After receiving a specific resource unit allocation index, the receiving device may determine, based on a preconfigured or predefined indication bit in the resource unit allocation index, that the number that is indicated by the resource unit allocation index and that is of MU-MIMO users supported in the RU whose size is greater than or equal to the 106-tone RU is less than or equal to 8 or is a value greater than 8. Different indexes corresponding to the same resource unit arrangement and combination are used to respectively indicate the number of MU-MIMO users that is greater than 8 and the number of MU-MIMO users that is less than or equal to 8. In this way, resources used to indicate the number of MU-MIMO users can be saved, and resource utilization of the resource unit index is improved. Alternatively, in another possible implementation, the number of MU-MIMO users that is indicated by each of two different indexes is predefined or preconfigured. In the first index, three bits are used to indicate that the number of MU-MIMO users supported in the RU whose size is greater than or equal to the 106-tone RU is less than or equal to 8. In the second index, four bits are used to indicate that the number of MU-MIMO users supported in the RU whose size is greater than or equal to the 106-tone RU is 9 to 16.

In some other embodiments, the resource unit allocation index includes a field (for example, may be a MU-MIMO user number indication field) used to indicate the number of MU-MIMO users supported in the resource unit that includes at least 106 subcarriers, a length of the indication field is greater than or equal to 4 bits, and the number of MU-MIMO users is greater than 8. The receiving device may determine, based on the MU-MIMO user number indication field, the number of MU-MIMO users supported in the resource unit that includes at least 106 subcarriers.

Specifically, in some other embodiments, an indication field whose length is 4 bits or greater than 4 bits may be predefined in the resource unit index. The indication field is used to indicate the number of MU-MIMO users supported in the resource unit that includes at least 106 subcarriers. The number of MU-MIMO users supported in the resource unit that includes at least 106 subcarriers may be greater than 8. For example, if an indication field whose length is equal to 4 bits may be used to indicate that the number of MU-MIMO users supported in the resource unit that includes at least 106 subcarriers is 9 to 16, an indication field whose length is greater than 4 bits may be used to indicate that the number of MU-MIMO users supported in the resource unit that includes at least 106 subcarriers is greater than 16. For example, in the index $01111y_3y_2y_1y_0$ in Table 3, $y_3y_2y_1y_0$ is used to indicate that the number of users supported in the 2×996-tone RU is 1 to 16. Alternatively, in the index $11111\times3\times2x_1x_0$, $x_3x_2x_1x_0$ is used to indicate that the number of users supported in the 4×996-tone RU is 1 to 16. After receiving the resource unit allocation index, the receiving device may determine, based on the indication field, the number that is indicated by the resource unit allocation index and that is of MU-MIMO users supported in the RU whose size is greater than or equal to the 106-tone RU. In addition, the number of MU-MIMO users is greater than 8. The indication field whose length is greater than or equal to 4 bits is used to indicate the number of MU-MIMO users supported in the resource unit that includes at least 106 subcarriers. In this way, it is easy to indicate that the number of MU-MIMO users is greater than 8, and accuracy of indicating the number of MU-MIMO users is improved. In addition, this is easy to implement.

In some embodiments, the signal field B further includes a first indication subfield, and the first indication subfield is used to indicate a bit width of the resource unit allocation index.

Specifically, before the resource unit allocation subfield, there may be an indication field (the first indication subfield) used to indicate a type of the resource unit allocation subfield in a signal field A or the signal field B. The first indication subfield is used to indicate the bit width of the resource unit allocation index. For example, the first indication subfield is used to indicate that the at least one resource unit allocation subfield is an 8-bit index, a 9-bit index, or an index of another bit length. The receiving device may determine the bit width (length) of the resource unit allocation index based on the first indication subfield.

The first indication subfield is set in the signal field B, so that the receiving device may accurately receive and parse the resource unit allocation subfield, to improve efficiency of determining, by the receiving device, the resource unit arrangement and combination and the number of MU-MIMO users that are indicated in the resource unit allocation subfield.

It should be understood that in addition to the signal field B or the signal field A, the first indication subfield may be set in another field included in the PPDU, provided that the first indication subfield is located before the at least one resource unit allocation subfield. This is not limited in this application.

Optionally, an optional feature may be set for receiving of a resource unit allocation subfield whose length is 9 bits or greater than 9 bits by the receiving device. For example, when the sending device is associated with the receiving device, the receiving device may claim a capability by using extremely high throughput capability information, to indicate whether the receiving device supports receiving of a resource unit allocation subfield whose length is 9 bits or greater than 9 bits. When a receiving device claims that the receiving device does not support receiving of a resource unit allocation subfield whose length is 9 bits or greater than 9 bits, the sending device may not send a PPDU that includes the resource unit allocation subfield to the receiving device.

According to the method for indicating the number of MU-MIMO users provided in this application, the resource unit allocation subfield is extended to an index whose length is 9 bits or greater than 9 bits, the reserved entry in the resource unit index table is used, or the resource unit index is changed, to indicate the number of users supported in the RU whose size is greater than or equal to the 106-tone RU. In this way, the case in which the number of users supported in the RU whose size is greater than or equal to the 106-tone RU is greater than 8 is indicated. Therefore, resource utilization and communication efficiency are improved.

Figure 11:
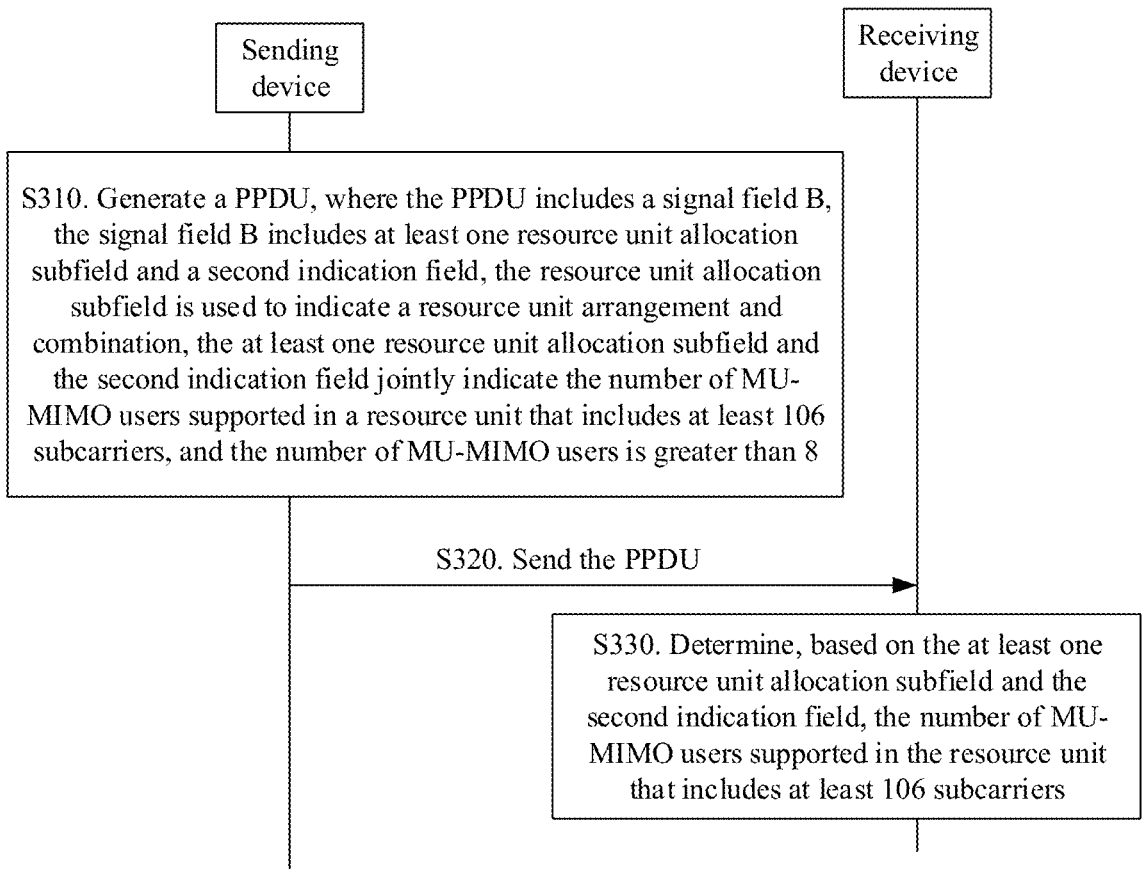
FIG. 11 is a schematic interaction diagram of another method for indicating the number of MU-MIMO users according to an embodiment of this application.

FIG. 11 is a schematic flowchart of a method 300 for indicating the number of MU-MIMO users according to an embodiment of this application. The method 300 may be applied to the scenario shown in FIG. 1. Certainly, the method 300 may be applied to another communication scenario or communications system. This is not limited in this embodiment of this application.

As shown in FIG. 11, the method 300 shown in FIG. 11 may include step S310 to step S330. The following describes in detail the steps in the method 300 with reference to FIG. 11. The method 300 includes the following steps.

S310. A sending device generates a physical layer protocol data unit PPDU, where the PPDU includes a signal field B, the signal field B includes at least one resource unit allocation subfield and a second indication field, the resource unit allocation subfield is used to indicate a resource unit arrangement and combination, the at least one resource unit allocation subfield and the second indication field jointly indicate the number of MU-MIMO users supported in a resource unit that includes at least 106 subcarriers, and the number of MU-MIMO users is greater than 8.

S320. The sending device sends the PPDU. Correspondingly, a receiving device receives the PPDU.

S330. The receiving device determines, based on the at least one resource unit allocation subfield and the second indication field, the number of MU-MIMO users supported in the resource unit that includes at least 106 subcarriers.

Specifically, in S310, when the sending device needs to send data to the receiving device, the sending device sends the PPDU to the receiving device. The PPDU includes the signal field B. In addition to the signal field B, the PPDU may further include an EHT-SIG-A field, a data field, and the like. The signal field B includes the at least one resource unit allocation subfield (RU allocation subfield). The signal field B may further include at least one per station field (user field). The resource unit allocation subfield is a resource unit allocation index, and the resource unit allocation index is used to indicate a resource unit arrangement and combination (or may be referred to as a resource unit allocation sequence). A sequence of the at least one per station field corresponds to the resource unit allocation sequence. The at least one per station field is used to indicate station information of allocated STAs in an RU included in the resource unit arrangement and combination. For example, the resource unit allocation index may be an 8-bit index, for example, as shown in Table 2. The resource unit allocation index whose length is 8 bits is used to indicate the resource unit arrangement and combination. The signal field B further includes the second indication field. The at least one resource unit allocation subfield and the second indication field jointly indicate the number of MU-MIMO users supported in the resource unit that includes at least 106 subcarriers. The number of MU-MIMO users is greater than 8. The PPDU includes the at least one resource unit allocation subfield, and the resource unit allocation index indicated in the resource unit allocation subfield may be any index in Table 2.

In S320, the sending device sends the PPDU to the receiving device. Correspondingly, a receiving device receives the PPDU.

In S330, after receiving the PPDU, the receiving device determines RU allocation based on the at least one resource unit allocation subfield and the resource unit allocation index corresponding to the resource unit allocation subfield, further reads the per station field based on a predetermined sequence indicated in the resource unit allocation subfield, determines a per station field corresponding to the receiving device, a resource unit to which the receiving device belongs, the corresponding number of spatial streams, a modulation and coding scheme, and the like based on a station identifier carried in the per station field, and may determine, by reading the at least one resource unit allocation subfield and the second indication field, the number of MU-MIMO users supported in the resource unit that includes at least 106 subcarriers. The resource unit that includes at least 106 subcarriers may be or may not be the resource unit to which the receiving device belongs. In addition, the number of MU-MIMO users may be greater than 8.

According to the method for indicating the number of MU-MIMO users provided in this application, the second indication field is added to the signal field B, and the second indication field and the at least one resource unit allocation subfield are used to jointly indicate the number of MU-MIMO users supported in the resource unit that includes at least 106 subcarriers. In this way, a case in which the number of users supported in the RU whose size is greater than or equal to a 106-tone RU is greater than 8 is indicated. A new indication field is added, so that the number of MU-MIMO users that is greater than 8 may be accurately and conveniently indicated. In addition, an existing resource unit allocation index table does not need to be changed, and this is easy to implement. Therefore, efficiency of indicating the number of MU-MIMO users that is greater than 8 is improved.

Figure 12:
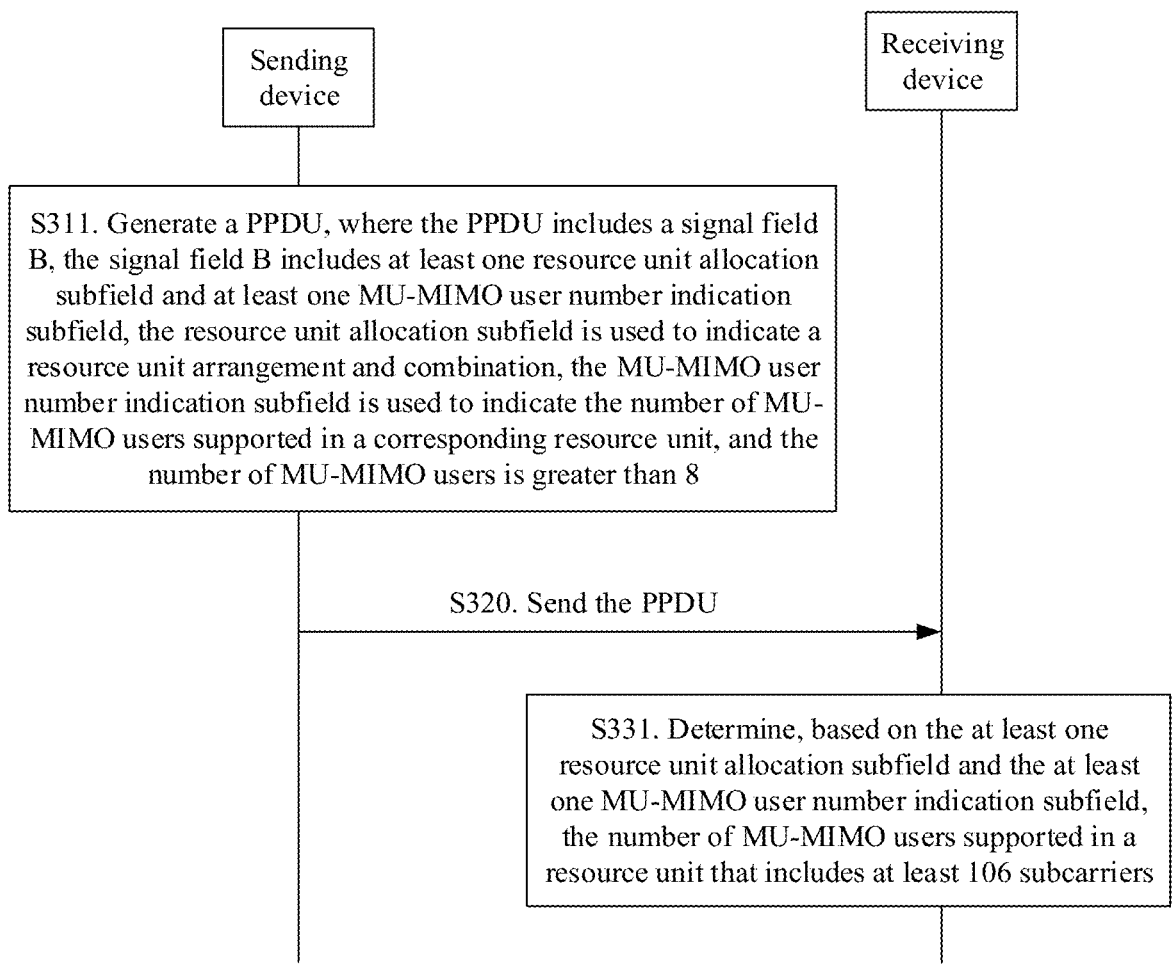
FIG. 12 is a schematic interaction diagram of another method for indicating the number of MU-MIMO users according to an embodiment of this application.

In some embodiments, the second indication field includes at least one MU-MIMO user number indication subfield. FIG. 12 is used as an example. Based on the steps of the method shown in FIG. 11, S310 "A sending device generates a physical layer protocol data unit PPDU, where the PPDU includes a signal field B, and the signal field B includes at least one resource unit allocation subfield and a second indication field" in the method 300 includes S311.

S311. The sending device generates the physical layer protocol data unit PPDU, where the PPDU includes the signal field B, the signal field B includes at least one resource unit allocation subfield and the at least one MU-MIMO user number indication subfield, the MU-MIMO user number indication subfield is used to indicate the number of MU-MIMO users supported in a corresponding resource unit allocation subfield, and the number of MU-MIMO users is greater than 8. S330 "The receiving device determines, based on the at least one resource unit allocation subfield and the second indication field, the number of MU-MIMO users supported in the resource unit allocation subfield that includes at least 106 subcarriers" in the method 300 includes S331.

S331. The receiving device determines, based on the at least one resource unit allocation subfield and the at least one MU-MIMO user number indication subfield, the number of MU-MIMO users supported in the resource unit that includes at least 106 subcarriers.

For a description of S320 shown in FIG. 12, refer to the foregoing description of S320. For brevity, details are not described herein again.

There are two manners of designing the at least one MU-MIMO user number indication subfield.

In a first design manner, the MU-MIMO user number indication subfield is in a one-to-one correspondence with a resource unit that is indicated in the resource unit allocation subfield, that includes at least 106 subcarriers, and that supports eight MU-MIMO users. In a second design manner, the number of MU-MIMO user number indication subfields is the same as a maximum value of the number of possible resource units that include at least 106 subcarriers.

The following separately describes the two different design manners.

Figure 13:
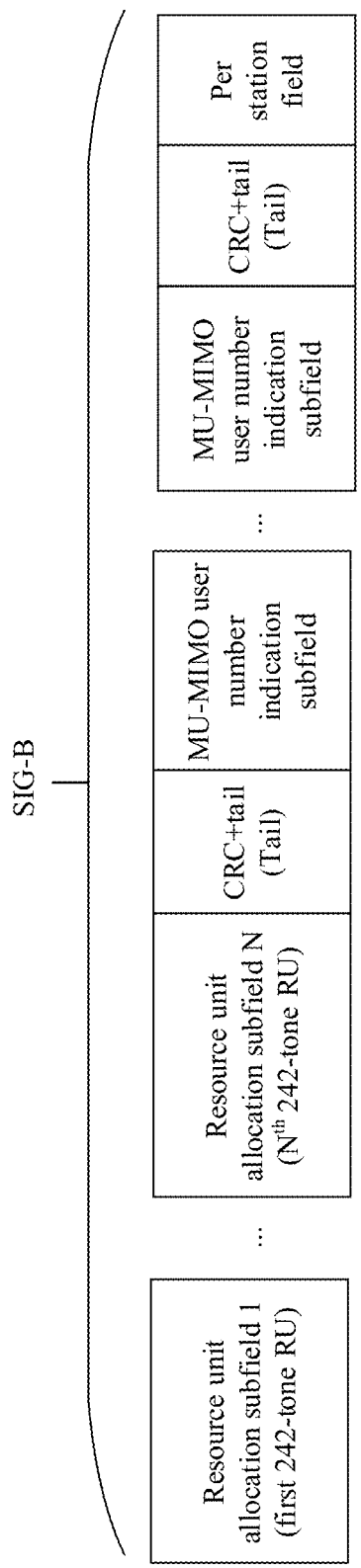
FIG. 13 is a schematic diagram of a structure of a signal field B according to an embodiment of this application.

FIG. 13 is a schematic diagram of a structure of the signal field B corresponding to the first design manner. As shown in FIG. 13, the signal field B includes the at least one resource unit allocation subfield and the at least one MU-MIMO user number indication subfield. It should be understood that the signal field B may further include at least one per station field. If a bandwidth is greater than or equal to 80 MHz, the signal field B further includes a center 26-tone RU indication field. The MU-MIMO user number indication subfield is in a one-to-one correspondence with the resource unit that is indicated in the resource unit allocation subfield, that includes at least 106 subcarriers, and that supports eight MU-MIMO users, and the MU-MIMO user number indication subfield is used to indicate the number of MU-MIMO users supported in the corresponding resource unit. In this case, a specific manner of indicating the number of MU-MIMO users is as follows:

If the number of MU-MIMO users supported in an RU whose size is greater than or equal to the 106-tone RU and that is indicated in the resource unit allocation subfield is less than 8, the resource unit allocation index shown in Table 2 is used for indication, and the resource unit allocation subfield is used to indicate the number of MU-MIMO users actually supported in the RU whose size is greater than or equal to the 106-tone RU. If an actual number of MU-MIMO users supported in the RU whose size is greater than or equal to the 106-tone RU is greater than or equal to 8, 8 is first indicated in the resource unit allocation subfield, and further, in a sequence of resource units that are indicated in the resource unit allocation subfield, whose size is greater than or equal to the 106-tone RU, and that support eight MU-MIMO users, there are MU-MIMO user number indication subfields that are in a one-to-one correspondence with the resource units whose size is greater than or equal to the 106-tone RU and that support eight MU-MIMO users. Content indicated in the MU-MIMO user number indication subfield may be a value obtained by subtracting 8 from the number of MU-MIMO users actually supported in the corresponding resource unit. In the first design rule, as shown in FIG. 13, CRC check and coding may be separately performed on the at least one resource unit allocation subfield and the at least one MU-MIMO user number indication subfield. The number of MU-MIMO user number indication subfields is the same as the number of resource units whose size is greater than or equal to the 106-tone RU and that support eight MU-MIMO users. The receiving device obtains, by receiving the RU allocation subfield, the number of MU-MIMO RUs that support eight users, and further obtains the number of subsequent MU-MIMO indication subfields.

Descriptions are provided below by using examples.

It is assumed that the data packet bandwidth is 40 MHz. With reference to content shown in FIG. 8, it may be learned that there are two CCs. A first CC (CC 1) includes a resource unit allocation subfield of a first 242-tone RU, and a second CC (CC 2) includes a resource unit allocation subfield of a second 242-tone RU. As shown in FIG. 14, it is assumed that a resource arrangement and combination of the first 242-tone RU is 106-tone RU+26-tone RU+106-tone RU, and a resource unit allocation index corresponding to the resource unit allocation subfield is $10y_2y_1y_0z_2z_1z_0$. The first 106-tone RU supports 10 MU-MIMO users, and the second 106-tone RU supports three MU-MIMO users.

A resource arrangement and combination of the second 242-tone RU is 106-tone RU+26-tone RU+52-tone RU+52-tone RU, and a resource unit allocation index corresponding to the resource unit allocation subfield is $01011y_2y_1y_0$. The first 106-tone RU supports eight MU-MIMO users.

Corresponding structures of the two CCs are shown in FIG. 15.

The CC 1 includes the resource unit allocation subfield of the first 242-tone RU. The first 106-tone RU supports 10 users, and indication is performed based on eight users. In that case, $y_2y_1y_0$ in the resource unit allocation index $10y_2y_1y_0z_2z_1z_0$ is indicated as 111 (binary numbers 0 to 7 correspond to one to eight users). The second 106-tone RU supports three users, and indication is performed based on three users. In this case, $z_2z_1z_0$ in $10y_2y_1y_0z_2z_1z_0$ is indicated as 010. Therefore, a first resource unit allocation subfield (RU allocation subfield) is indicated as 10111010. Further, the bandwidth is less than 80 MHz, and therefore there is no center 26-tone RU indication. There is one indicated RU that supports eight users in the RU allocation subfield, and therefore there is one MU-MIMO user number indication subfield. The MU-MIMO user number indication subfield corresponds to the first 106-tone RU. An indicated value is 10−8=2, indicating that there are two additional users in addition to eight users. Based on a resource allocation sequence, a per station field in the CC 1 includes indication information of a total of 14 STAs.

The CC 2 includes the resource unit allocation subfield of the second 242-tone RU. The first 106-tone RU supports eight users, and indication is performed based on eight users. In this case, $y_2y_1y_0$ in the resource unit allocation index $01011y_2y_1y_0$ is indicated as 111. Therefore, a second RU allocation subfield is indicated as 01011111. Further, the bandwidth is less than 80 MHz, and therefore there is no center 26-tone RU indication. There is one indicated RU that supports eight users in the RU allocation subfield, and therefore there is one MU-MIMO user number indication subfield. An indicated value is 8−8=0, indicating that there are no additional users in addition to eight users. A per station field includes indication information of a total of 11 STAs.

After receiving the at least one resource unit allocation subfield and the at least one MU-MIMO user number indication subfield, the receiving device first determines RU allocation based on the resource unit allocation index corresponding to the resource unit allocation subfield, and further determines, based on the resource unit allocation index, whether the number that is indicated by the index and that is of MU-MIMO users supported in the RU (which is referred to as a first RU for differentiation) whose size is greater than or equal to the 106-tone RU is less than 8 or equal to 8. If the number of MU-MIMO users is less than 8, the number of MU-MIMO users that is indicated by the resource unit allocation index is an actual number of MU-MIMO users supported in the first RU. If the number of MU-MIMO users is equal to 8, a MU-MIMO user number indication subfield corresponding to the first RU is read from the at least one MU-MIMO user number indication subfield based on a ranking of the first RU in the resource units whose size is greater than or equal to the 106-tone RU and that support eight MU-MIMO users, the number of MU- MIMO users that is indicated by the MU-MIMO user number indication subfield corresponding to the first RU is determined, and the number of users actually supported in the first RU is obtained by increasing the number of MU-MIMO users by 8.

Optionally, to make the CC 1 and the CC 2 have a same length, the CC 2 may further include a padding field. In this way, the receiving device can more accurately and quickly parse the CC 1 and the CC 2. Therefore, efficiency of obtaining the number of MU-MIMO users by the receiving device is improved.

CRC check and coding are separately performed on the at least one resource unit allocation subfield and the at least one MU-MIMO user number indication subfield, and the at least one resource unit allocation subfield and the at least one MU-MIMO user number indication subfield are used to indicate the number of MU-MIMO users. In this way, efficiency of indicating the number of MU-MIMO users can be improved, an unnecessary MU-MIMO user number indication subfield is avoided, there are relatively small overheads, and resources are saved. In addition, this helps the receiving device perform parsing to obtain the number of MU-MIMO users. Therefore, efficiency of indicating the number of MU-MIMO users that is greater than 8 is improved.

FIG. 16 is a schematic diagram of a structure of the signal field B corresponding to the second design manner. As shown in FIG. 16, the signal field B includes the at least one resource unit allocation subfield and the at least one MU-MIMO user number indication subfield. It should be understood that the signal field B may further include at least one per station field. If a bandwidth is greater than or equal to 80 MHz, the signal field B further includes a center 26-tone RU indication field. The number of MU-MIMO user number indication subfields is the same as a maximum number of possible resource units that include at least 106 subcarriers. The MU-MIMO user number indication subfield is used to indicate the number of MU-MIMO users supported in the corresponding resource unit. In the second design rule, as shown in FIG. 16, CRC check and coding are performed on the at least one resource unit allocation subfield and the at least one MU-MIMO user number indication subfield in a unified manner. In this case, a specific manner of indicating the number of MU-MIMO users is similar to that in the first design manner, except that the number of MU-MIMO user number indication subfields may be different from the number of MU-MIMO user number indication subfields in the first design manner. CRC check and coding are performed on the at least one resource unit allocation subfield and the at least one MU-MIMO user number indication subfield in the unified manner, and therefore the number of MU-MIMO user number indication subfields needs to be obtained before the RU allocation subfield is read. In this way, the receiving device may know locations of CRC and a tail subfield, perform decoding and check, and then parse corresponding information. That is, the number of MU-MIMO user number indication subfields is fixed. Therefore, because one RU allocation subfield indicates a maximum of two 106-tone RUs or indicates one RU whose size is greater than the 106-tone RU, design is performed based on the maximum value of the number of possible 106-tone RUs. The number of MU-MIMO user number indication subfields is twice the number of resource unit allocation subfields.

For example, description is provided with reference to the resource unit arrangement and combination manner shown in FIG. 14. Corresponding structures of two CCs are shown in FIG. 17.

A CC 1 includes a resource unit allocation subfield of a first 242-tone RU. A first 106-tone RU supports 10 users, and indication is performed based on eight users. In this case, $y_2y_1y_0$ in a resource unit allocation index $10y_2y_1y_0z_2z_1z_0$ is indicated as 111 (binary numbers 0 to 7 correspond to one to eight users). A second 106-tone RU supports three users, and indication is performed based on three users. In this case, $z_2z_1z_0$ in $10y_2y_1y_0z_2z_1z_0$ is indicated as 010. Therefore, a first resource unit allocation subfield (RU allocation subfield) is indicated as 10111010. Further, the bandwidth is less than 80 MHz, and therefore there is no center 26-tone RU indication. Coding is performed on the MU-MIMO user number indication subfield and the resource unit allocation subfield in the unified manner, and therefore the number of MU-MIMO user number indication subfields needs to be obtained before the RU allocation subfield is read. As shown in FIG. 17, in the CC 1, the number of MU-MIMO user number indication subfields may be the same as the maximum value of the number of possible 106-tone RUs, that is, may be the same as a maximum value of the number of 106-tone RUs that may perform MU-MIMO transmission, that is, may be obtained by multiplying the number of RU allocation subfields by 2. Therefore, in the CC 1, although there is only one 106-tone RU that supports more than eight MU-MIMO users, there are two MU-MIMO user number indication subfields. A value indicated in a first MU-MIMO user number indication subfield is 2, and a second MU-MIMO user number indication subfield may be reserved, or may perform no indication.

A CC 2 includes a resource unit allocation subfield of a second 242-tone RU. A first 106-tone RU supports eight users, and indication is performed based on eight users. In this case, $y_2y_1y_0$ in a resource unit allocation index $01011y_2y_1y_0$ is indicated as 111. Therefore, a second RU allocation subfield is indicated as 01011111. Further, the bandwidth is less than 80 MHz, and therefore there is no center 26-tone RU indication. Although there is only one indicated RU that supports eight users in the RU allocation subfield, there are two MU-MIMO user number indication subfields. A value indicated in a first MU-MIMO user number indication subfield is 0, indicating that there is no additional users in addition to eight users. A second MU-MIMO user number indication subfield may be reserved, or may perform no indication.

It should be understood that although the number of MU-MIMO user number indication subfields in the second design manner is designed based on the maximum value of the number of possible 106-tone RUs, an actual number of MU-MIMO user number indication subfields is still the same as that in the first implementation. If there are remaining MU-MIMO user number indication subfields, the MU-MIMO user number indication subfields may be reserved, or may perform no indication.

CRC check and coding are performed on the at least one resource unit allocation subfield and the at least one MU-MIMO user number indication subfield in the unified manner, and the at least one resource unit allocation subfield and the at least one MU-MIMO user number indication subfield are used to indicate the number of MU-MIMO users. In this way, it can be ensured that there is a corresponding MU-MIMO user number indication subfield for each RU whose size is greater than or equal to the 106-tone RU, and reliability of indicating the number of MU-MIMO users that is greater than 8 is ensured.

Figure 18:
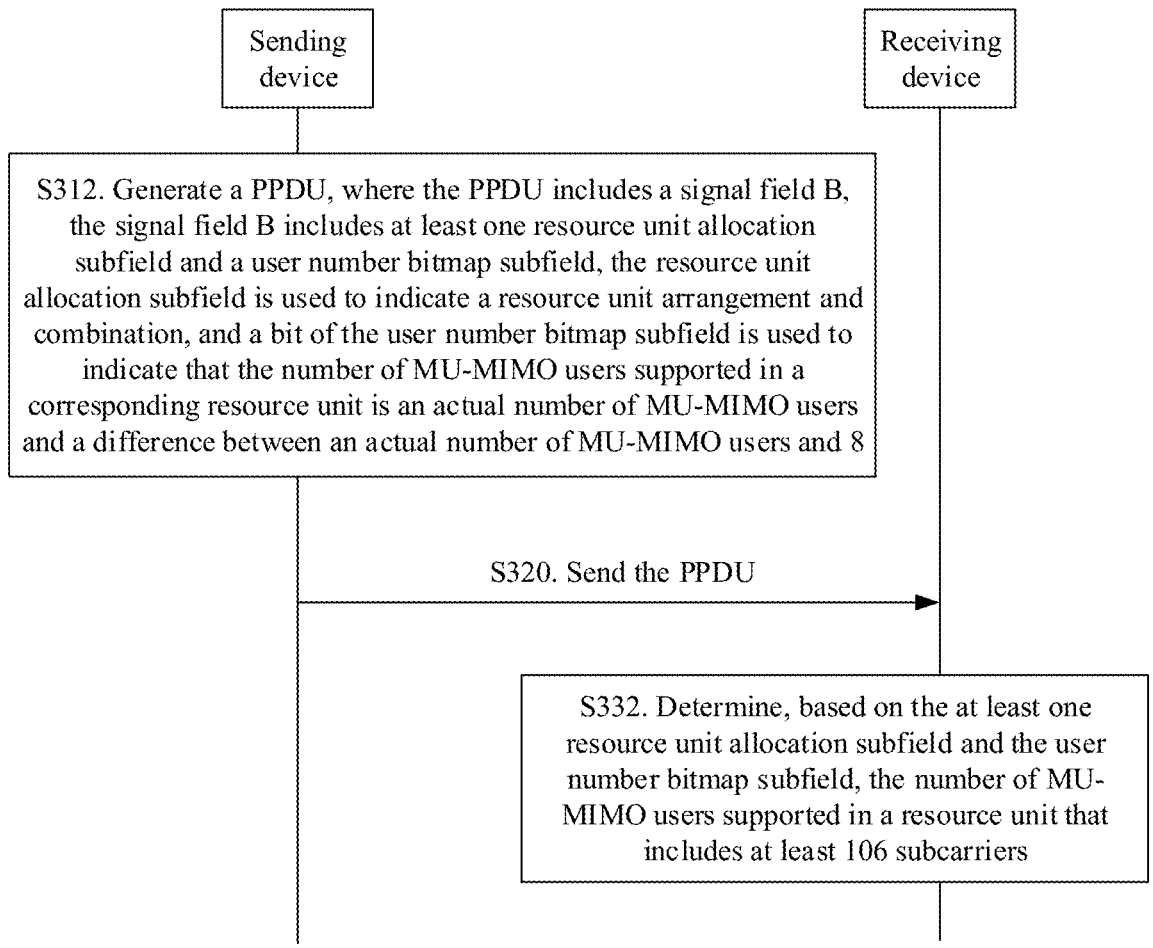
FIG. 18 is a schematic interaction diagram of still another method for indicating the number of MU-MIMO users according to an embodiment of this application.

In some other embodiments, the second indication field includes a user number bitmap subfield. FIG. 18 is used as an example. Based on the steps of the method shown in FIG.

11, S310 "A sending device generates a physical layer protocol data unit PPDU, where the PPDU includes a signal field B, and the signal field B includes at least one resource unit allocation subfield and a second indication field" in the method 300 includes S312.

S312. The sending device generates the physical layer protocol data unit PPDU, where the PPDU includes the signal field B, the signal field B includes at least one resource unit and the user number bitmap subfield, and a bit of the user number bitmap subfield is used to indicate that the number of MU-MIMO users supported in a corresponding resource unit is an actual number of MU-MIMO users or a difference between an actual number of MU-MIMO users and 8.

S330 "The receiving device determines, based on the at least one resource unit allocation subfield and the second indication field, the number of MU-MIMO users supported in the resource unit that includes at least 106 subcarriers" in the method 300 includes S332.

S332. The receiving device determines, based on the at least one resource unit allocation subfield and the user number bitmap, the number of MU-MIMO users supported in the resource unit that includes at least 106 subcarriers.

For a description of S320 shown in FIG. 18, refer to the foregoing description of S320. For brevity, details are not described herein again.

There are also two manners of designing the user number bitmap subfield.

In a first design manner, the bit of the user number bitmap subfield is in a one-to-one correspondence with a resource unit that is indicated in the resource unit allocation subfield and that includes at least 106 subcarriers.

In a second design manner, a length of the user number bitmap subfield is the same as a maximum number of possible resource units that include at least 106 subcarriers.

The following separately describes the two different design manners.

Figure 19:
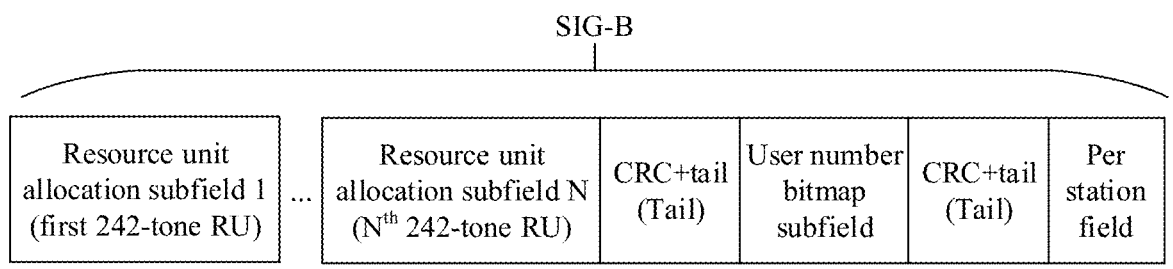
FIG. 19 is still another schematic diagram of a structure of a signal field B according to an embodiment of this application.

FIG. 19 is a schematic diagram of a structure of the signal field B corresponding to the first design manner. As shown in FIG. 19, the signal field B includes the at least one resource unit allocation subfield and the user number bitmap subfield. It should be understood that the signal field B may further include at least one per station field. If a bandwidth is greater than or equal to 80 MHz, the signal field B further includes a center 26-tone RU indication field. The bit of the user number bitmap subfield is in a one-to-one correspondence with the resource unit that is indicated in the resource unit allocation subfield and that includes at least 106 subcarriers, and the bit of the user number bitmap subfield is used to indicate that the number of MU-MIMO users supported in the corresponding resource unit is the actual number of MU-MIMO users or the difference between the actual number of MU-MIMO users and 8. In this case, a specific manner of indicating the number of MU-MIMO users is as follows:

For the RU whose size is greater than or equal to the 106-tone RU and that is indicated in the resource unit allocation subfield, there are two manners of indicating the number of MU-MIMO users.

Manner a: If the number of MU-MIMO users supported in the RU whose size is greater than or equal to the 106-tone RU is less than or equal to 8, the resource unit allocation index shown in Table 2 is used for indication, and the resource unit allocation subfield is used to indicate the number of MU-MIMO users actually supported in the RU whose size is greater than or equal to the 106-tone RU.

Manner b: If the actual number (it is assumed that the number is X) of MU-MIMO users supported in the RU whose size is greater than or equal to the 106-tone RU is greater than 8, X-8 is first indicated in the resource unit allocation subfield.

Further, for the foregoing two manners (the manner a and the manner b), the bit of the user number bitmap subfield is used to indicate that a manner of indicating the number of MU-MIMO users in the RU whose size is greater than or equal to the 106-tone RU is the manner a or the manner b. Based on a sequence of resource units whose size is greater than or equal to the 106-tone RU and that are indicated in the resource unit allocation subfield, the bit of the user number bitmap subfield is in a one-to-one correspondence with the resource unit that is indicated in the resource unit allocation subfield and that includes at least 106 subcarriers. In the first design rule, as shown in FIG. 19, CRC check and coding may be separately performed on the at least one resource unit allocation subfield and the user number bitmap subfield. A length (number of bits) of the user number bitmap subfield is the same as the number of resource units that are indicated in the resource unit allocation subfield and whose size is greater than or equal to the 106-tone RU. The receiving receive obtains, by receiving the RU allocation subfield, the number of resource units whose size is greater than or equal to the 106-tone RU, and further obtains the number of bits of the subsequent user number bitmap subfield.

For example, description is provided with reference to the resource unit arrangement and combination manner shown in FIG. 14. Corresponding structures of two CCs are shown in FIG. 20.

A CC 1 includes a resource unit allocation subfield of a first 242-tone RU. A first 106-tone RU supports 10 users, and indication is performed based on 10−8=2 users. In this case, $y_2y_1y_0$ in a resource unit allocation index $10y_2y_1y_0z_2z_1z_0$ is indicated as 001 (binary numbers 0 to 7 correspond to one to eight users). A second 106-tone RU supports three users, and indication is performed based on three users. In this case, $z_2z_1z_0$ in $10y_2y_1y_0z_2z_1z_0$ is indicated as 010. Therefore, a first resource unit allocation subfield (RU allocation subfield) is indicated as 10111010. Further, the bandwidth is less than 80 MHz, and therefore there is no center 26-tone RU indication. Coding is separately performed on the user number bitmap subfield and the resource unit allocation subfield, and therefore the receiving receive may obtain, by receiving the RU allocation subfield, the number of resource units whose size is greater than or equal to the 106-tone RU, and further obtain the number of bits of the subsequent user number bitmap subfield. As shown in FIG. 20, there is further a user number bitmap subfield whose length is 2 bits. The user number bitmap subfield whose length is 2 bits may be indicated as 01 (it is assumed that "0" represents the manner b and "1" represents the manner a) or 10 (it is assumed that "1" represents the manner b, and 0" represents the manner a). If the bit indicates the manner b, the number of users actually supported in the RU whose size is greater than or equal to the 106-tone RU and that corresponds to the bit is the number of users indicated by the resource unit allocation index+8.

A CC 2 includes a resource unit allocation subfield of a second 242-tone RU. A first 106-tone RU supports eight users, and indication is performed based on eight users. In this case, $y_2y_1y_0$ in $01011y_2y_1y_0$ is indicated as 111. Therefore, a second RU allocation subfield is indicated as 01011111. Further, the bandwidth is less than 80 MHz, and therefore there is no center 26-tone RU indication. There is only one indicated RU that supports eight users in the RU allocation subfield, and there is further a user number bitmap subfield whose length is 1 bit. The user number bitmap subfield whose length is 1 bit is indicated as 1 (it is assumed that "0" represents the manner b, and "1" represents the manner a) or 0 (it is assumed that "1" represents the manner b, and "0" represents the manner a), and indicates that the number of MU-MIMO users actually supported in the 106-tone RU is the number of MU-MIMO users indicated by the resource unit allocation index.

After receiving the at least one resource unit allocation subfield and the user number bitmap subfield, the receiving device first determines RU allocation based on the resource unit allocation index corresponding to the resource unit allocation subfield, further reads the per station field based on a predetermined sequence indicated in the resource unit allocation subfield, determines a per station field corresponding to the receiving device, a resource unit to which the receiving device belongs, the corresponding number of spatial streams, a modulation and coding scheme, and the like based on a station identifier carried in the per station field, and further determines, based on the resource unit allocation index, the number that is indicated by the index and that is of MU-MIMO users supported in the RU (which is referred to as a second RU for differentiation) whose size is greater than or equal to the 106-tone RU. The receiving device then reads a bit corresponding to the second RU from the user number bitmap subfield, and determines that the number of MU-MIMO users indicated by the resource unit allocation index corresponding to the second RU is the number of MU-MIMO users actually supported in the second RU or a difference between an actual number of MU-MIMO users and 8. If the number of MU-MIMO users is the difference between the number of MU-MIMO users actually supported in the second RU and 8, the number of MU-MIMO users actually supported in the second RU may be obtained by increasing the difference by 8.

CRC check and coding are separately performed on the at least one resource unit allocation subfield and the user number bitmap subfield, and the at least one resource unit allocation subfield and the user number bitmap subfield are used to jointly indicate the number of MU-MIMO users. In this way, efficiency of indicating the number of MU-MIMO users can be improved, an unnecessary or useless user bit is avoided, there are relatively small overheads, and resources are saved. In addition, this helps the receiving device perform parsing to obtain the number of MU-MIMO users. Therefore, efficiency of indicating the number of MU-MIMO users that is greater than 8 is improved.

FIG. 21 is a schematic diagram of a structure of the signal field B corresponding to the second design manner. As shown in FIG. 21, the signal field B includes the at least one resource unit allocation subfield and the user number bitmap subfield. It should be understood that the signal field B may further include at least one per station field. If a bandwidth is greater than or equal to 80 MHz, the signal field B further includes a center 26-tone RU indication field. A bit width of the user number bitmap subfield is the same as the maximum number of possible resource units that include at least 106 subcarriers. The bit of the user number bitmap subfield is used to indicate that the number of MU-MIMO users supported in the corresponding resource unit is the actual number of MU-MIMO users and the difference between the actual number of MU-MIMO users and 8. In the second design, as shown in FIG. 21, CRC check and coding are performed on the at least one resource unit allocation subfield and the user number bitmap subfield in a unified manner. In this case, a specific manner of indicating the number of MU-MIMO users is similar to that in the first design manner, except that the length of the user number bitmap may be different from the length of the user number bitmap subfield in the first design manner. CRC check and coding may be performed on the at least one resource unit allocation subfield and the user number bitmap subfield in the unified manner, and therefore the user number bitmap subfield needs to be obtained before the RU allocation subfield is read. In this way, the receiving device may know locations of CRC and a tail subfield, perform decoding and check, and then parse corresponding information. That is, the length of the user number bitmap subfield is fixed. Therefore, because one RU allocation subfield includes a maximum of two 106-tone RUs or includes one RU whose size is greater than the 106-tone RU, design is performed based on a maximum value of the number of possible 106-tone RUs. The length (number of bits) of the user number bitmap is twice the number of resource unit allocation subfields.

For example, description is provided with reference to the resource unit arrangement and combination manner shown in FIG. 14. Corresponding structures of two CCs are shown in FIG. 22.

A CC 1 includes a resource unit allocation subfield of a first 242-tone RU. The first 106-tone RU supports 10 users, and indication is performed based on 10−8=2 users. In this case, $y_2y_1y_0$ in a resource unit allocation index $10y_2y_1y_0z_2z_1z_0$ is indicated as 001 (binary numbers 0 to 7 correspond to one to eight users). A second 106-tone RU supports three users, and indication is performed based on three users. In this case, $z_2z_1z_0$ in $10y_2y_1y_0z_2z_1z_0$ is indicated as 010. Therefore, a first resource unit allocation subfield (RU allocation subfield) is indicated as 10111010. The bandwidth is less than 80 MHz, and therefore there is no center 26-tone RU indication. Coding is performed on the user number bitmap subfield and the resource unit allocation subfield in the unified manner, and therefore the length of the user number bitmap subfield needs to be obtained before the RU allocation subfield is read. As shown in FIG. 22, in the CC 1, the length of the user number bitmap subfield may be the same as the maximum value of the number of possible 106-tone RUs, that is, may be the same as a maximum value of the number of 106-tone RUs that may perform MU-MIMO transmission, that is, may be obtained by multiplying the number of RU allocation subfields by 2. Therefore, there is further a user number bitmap subfield whose length is 2 bits in the CC 1. A first bit corresponds to the first 106-tone RU, and a second bit corresponds to the second 106-tone RU.

A CC 2 includes a resource unit allocation subfield of a second 242-tone RU. A first 106-tone RU supports eight users, and indication is performed based on eight users. In this case, $y_2y_1y_0$ in a resource unit allocation index $01011y_2y_1y_0$ is indicated as 111. Therefore, a second RU allocation subfield is indicated as 01011111. Further, the bandwidth is less than 80 MHz, and therefore there is no center 26-tone RU indication. Although there is only one 106-tone RU in the RU allocation subfield, there is further a user number bitmap subfield whose length is 2 bits. A first bit corresponds to the first 106-tone RU. A second bit may be reserved, or may perform no indication.

CRC check and coding are performed on the at least one resource unit allocation subfield and the user number bitmap subfield in the unified manner, and the at least one resource unit allocation subfield and the user number bitmap subfield are used to indicate the number of MU-MIMO users. In this way, it can be ensured that there is a corresponding user number bit for each RU whose size is greater than or equal to the 106-tone RU, and reliability of indicating the number of MU-MIMO users that is greater than 8 is ensured. In addition, there are relatively small overheads.

In some other embodiments provided in this application, for MU-MIMO in a full-bandwidth mode, namely, a non-OFDMA scenario, an entire bandwidth is allocated to a group of users, and no frequency division is performed. In the 802.11ax standard, it is indicated in an HE-SIG-A field that an HE-SIG-B field is in a compressed mode, and an indication of the number of symbols of the HE-SIG-B field is reused, to indicate the number of users for performing full-bandwidth MU-MIMO transmission. In this case, the HE-SIG-B field does not include a public field, and a per station field is directly indicated.

In this embodiment of this application, a transmission mode in which the number of MU-MIMO users that is greater than 8 is supported may be limited, to indicate that the number of MU-MIMO users is greater than 8. For example, there is a limitation that only when full-bandwidth MU-MIMO transmission is performed, that is, when MU-MIMO transmission in a non-OFDMA case is performed, MU-MIMO transmission of more than eight users is supported. In an OFDMA scenario, when an RU whose size is less than a full bandwidth is used for MU-MIMO transmission, the RU supports MU-MIMO transmission of a maximum of eight users. In a full-bandwidth MU-MIMO scenario, a field that is used to indicate the number of symbols of an EHT-SIG-B field and that is in an EHT-SIG-A field may be reused, to indicate the number of MU-MIMO users. Alternatively, a new field may be set in an EHT-SIG-A field or an EHT-SIG-B field, to indicate the number of MU-MIMO users.

In addition, a field used to indicate full-bandwidth MU-MIMO transmission may be further set in the EHT-SIG-A field or the EHT-SIG-B field.

Specifically, the sending device may send a PPDU to the receiving device. The PPDU includes a signal field A and/or a signal field B. The signal field A or the signal field B includes a full-bandwidth MU-MIMO transmission indication field and a full-bandwidth MU-MIMO user number indication field. The full-bandwidth MU-MIMO transmission indication field is used to indicate full-bandwidth MU-MIMO transmission. The full-bandwidth MU-MIMO user number indication field is used to indicate the number of MU-MIMO users supported during full-bandwidth MU-MIMO transmission. The number of MU-MIMO users is greater than 8. The signal field B may further include at least one station field (user field). Each station field indicates station information in a full bandwidth during full-bandwidth MU-MIMO transmission. The receiving device may determine, based on the PPDU and the full-bandwidth MU-MIMO transmission indication field and the full-bandwidth MU-MIMO user number indication field that are included in the signal field A or the signal field B, the number of MU-MIMO users supported during full-bandwidth MU-MIM transmission. In addition, the number of MU-MIMO users is greater than 8. For example, for the full-bandwidth MU-MIMO user number indication field, the field that is used to indicate the number of symbols of the EHT-SIG-B field and that is in the EHT-SIG-A field may be reused, and 4 bits are used to indicate the number of full-bandwidth MU-MIMO users.

There is a limitation that MU-MIMO transmission of more than eight users is supported only when full-bandwidth MU-MIMO transmission is performed. In the OFDMA scenario, when the RU whose size is less than the full bandwidth is used for MU-MIMO transmission, the RU supports MU-MIMO transmission of a maximum of eight users. In this way, a case in which the number of MU-MIMO users is greater than 8 is indicated. This is easy to implement, and there is low complexity.

Figure 23:
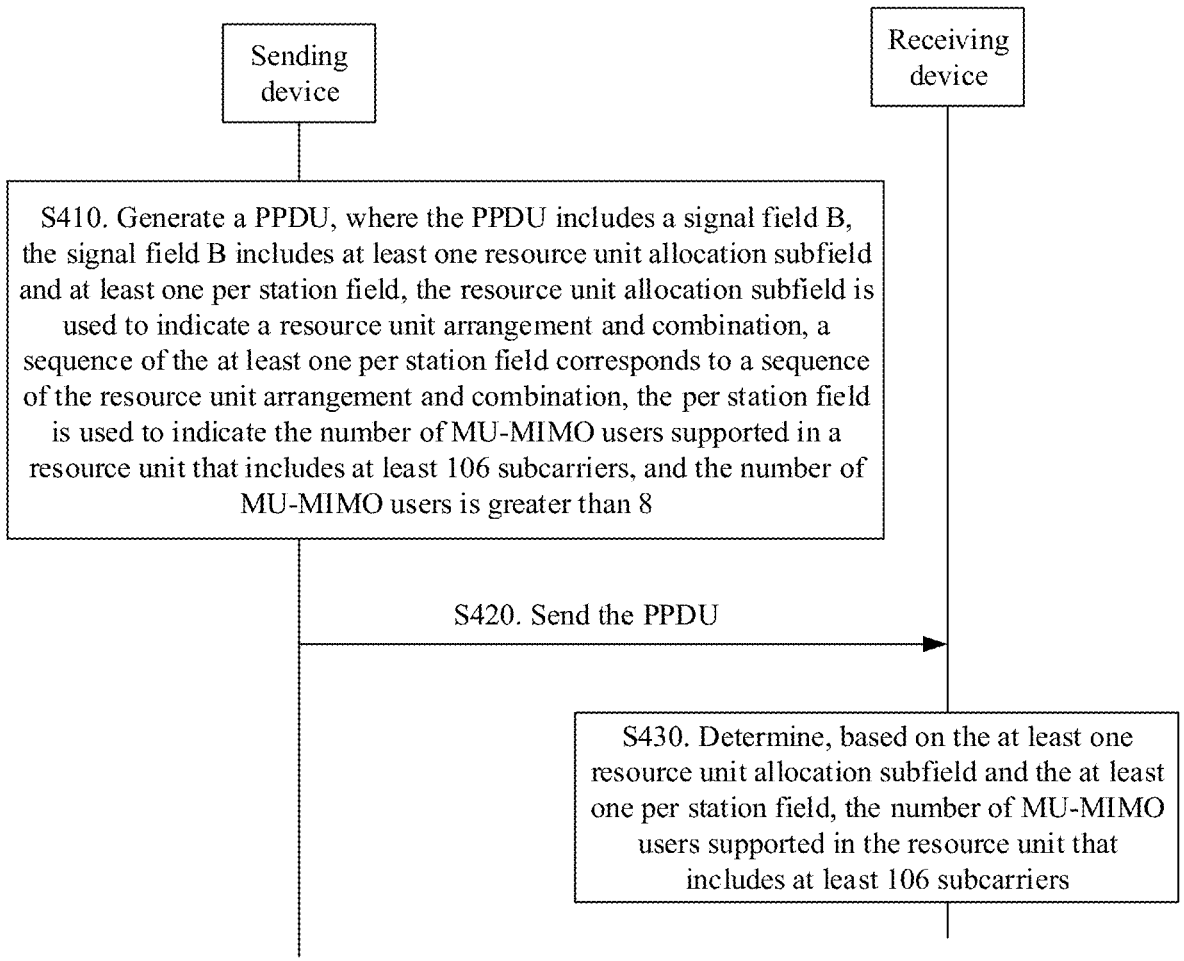
FIG. 23 is a schematic interaction diagram of another method for indicating the number of MU-MIMO users according to an embodiment of this application.

FIG. 23 is a schematic flowchart of a method 400 for indicating the number of MU-MIMO users according to an embodiment of this application. The method 400 may be applied to the scenario shown in FIG. 1. Certainly, the method 400 may be applied to another communication scenario or communications system. This is not limited in this embodiment of this application.

As shown in FIG. 23, the method 400 shown in FIG. 23 may include step S410 to step S430. The following describes in detail the steps in the method 400 with reference to FIG. 23. The method 400 includes the following steps.

S410. A sending device generates a physical layer protocol data unit PPDU, where the PPDU includes a signal field B, the signal field B includes at least one resource unit allocation subfield and at least one per station field, the resource unit allocation subfield is used to indicate a resource unit arrangement and combination, a sequence of the at least one per station field corresponds to a sequence of the resource unit arrangement and combination, the per station field is used to indicate the number of MU-MIMO users supported in a resource unit that includes at least 106 subcarriers, and the number of MU-MIMO users is greater than 8.

S420. The sending device sends the PPDU to a receiving device. Correspondingly, the receiving device receives the PPDU.

S430. The receiving device determines, based on the at least one resource unit allocation subfield and the at least one per station field, the number of MU-MIMO users supported in a resource unit (a resource unit that includes at least 106 subcarriers) in which the receiving device is located, where the number of MU-MIMO users is greater than 8.

Specifically, in S410, when the sending device needs to send data to the receiving device, the sending device sends the PPDU to the receiving device. The PPDU includes the signal field B. In addition to the signal field B, the PPDU may further include an HE-SIG-A field, an L-STF field, a data field, and the like. The signal field B may be the HE-SIG-B field shown in FIG. 2, and a structure of the signal field B may be similar to the structure of the HE-SIG-B field shown in FIG. 3. The signal field B includes the at least one resource unit allocation subfield (RU allocation subfield) and the at least one per station field. The resource unit allocation subfield is a resource unit allocation index, and the resource unit allocation index is used to indicate a resource unit arrangement and combination (or may be referred to as a resource unit allocation sequence). A sequence of the at least one per station field corresponds to the resource unit allocation sequence. The at least one per station field is used to indicate station information of allocated STAs in an RU included in the resource unit arrangement and combination. The resource unit allocation index may include 8 bits, and the resource unit allocation index whose length is 8 bits is used to indicate the resource unit arrangement and combination. The per station field is used to indicate the number of MU-MIMO users supported in a resource unit that includes at least 106 subcarriers and in which a station is located. The number of MU-MIMO users is greater than 8.

In S420, the sending device sends the PPDU to the receiving device. Correspondingly, the receiving device receives the PPDU.

In S430, after receiving the PPDU, the receiving device determines RU allocation based on the at least one resource unit allocation subfield and the resource unit allocation index corresponding to the resource unit allocation subfield, further reads the per station field based on a predetermined sequence indicated in the resource unit allocation subfield, determines a per station field (it is assumed that the per station field is a first station field) corresponding to the receiving device based on a station identifier carried in the per station field, obtains a resource unit corresponding to the first station field, the corresponding number of spatial streams, a modulation and coding scheme, and the like based on the first station field, and further determines, based on the first station field, the number of MU-MIMO users supported in the resource unit (a resource unit that includes at least 106 subcarriers) in which the receiving device is located.

According to the method for indicating the number of MU-MIMO users provided in this application, the per station field in the signal field B is used to indicate the number of MU-MIMO users supported in the corresponding resource unit that includes at least 106 subcarriers, and the number of MU-MIMO users is greater than 8. In this way, a case in which the number of users supported in the RU whose size is greater than or equal to a 106-tone RU is greater than 8 is indicated. Therefore, the number of MU-MIMO users that is greater than 8 can be accurately and conveniently indicated. In addition, an existing resource unit allocation index table does not need to be changed, and this is easy to implement. Therefore, efficiency of indicating the number of MU-MIMO users that is greater than 8 is improved.

In some embodiments, a first per station field in the at least one per station field includes a MU-MIMO user number indication subfield, the first per station field corresponds to the resource unit that includes at least 106 subcarriers, the MU-MIMO user number indication subfield is used to indicate the number of MU-MIMO users supported in the resource unit that includes at least 106 subcarriers, and the number of MU-MIMO users is greater than 8.

Specifically, when the per station field is used to indicate the number of MU-MIMO users supported in the resource unit that includes at least 106 subcarriers and in which the station is located, the MU-MIMO user number indication subfield may be added to the per station field, and is used to indicate the number of MU-MIMO users supported in the resource unit corresponding to the per station field. For example, the MU-MIMO user number indication subfield may be added to each per station field. If a resource unit corresponding to a specific per station field is less than a 106-tone RU, the number of MU-MIMO users indicated in a MU-MIMO user number indication subfield in the per station field is 1. If a resource unit corresponding to a specific per station field is greater than or equal to the 106-tone RU, the number of MU-MIMO users indicated in a MU-MIMO user number indication subfield in the per station field may be greater than 8, for example, may be 9 to 16. For another example, the MU-MIMO user number indication subfield may be added only to one or more per station fields (first per station fields) corresponding to the RU whose size is greater than or equal to the 106-tone RU, and is used to indicate the number of MU-MIMO users supported in the RU whose size is greater than or equal to the 106-tone RU. The number of MU-MIMO users indicated in the MU-MIMO user number indication subfield may be greater than 8.

For example, Table 5 shows subfields included in the per station field (or may be referred to as a station field) in an embodiment of this application. As shown in Table 5, the per station field includes a station identifier subfield, a space allocation subfield, a modulation and coding scheme subfield, a reserved field, and a coding subfield. The space allocation subfield is used to indicate the number of spatial streams of a station in a MU-MIMO resource. The MU-MIMO resource may be understood as a resource greater than or equal to the 106-tone RU, for example, a 242-tone RU, a 484-tone RU, or a 996-tone RU. As shown in Table 5, the MU-MIMO user number indication subfield may be further added to the per station field, to indicate the number of MU-MIMO users supported in the resource unit corresponding to the per station field. It should be understood that the MU-MIMO user number indication subfield shown in Table 5 includes 4 bits. Optionally, a bit width of the MU-MIMO user number indication subfield may be of another length, for example, 5 bits or 6 bits. A length of the MU-MIMO user number indication subfield is not limited in this application.

TABLE 5

Content included in the per station field

| Bit | Subfield | Number of bits | Meaning |
| --- | --- | --- | --- |
| $B_0$-$B_{10}$ | Station identifier | 11 | Indicates identification information of a station |
| $B_{11}$-$B_{14}$ | Space allocation | 4 | Indicates the number of spatial streams of the STA in the MU-MIMO resource |
| $B_{15}$-$B_{18}$ | Modulation and coding scheme | 4 | Indicates a modulation and coding scheme of the station |
| $B_{19}$ | Reserved | 1 | Reserved and set to 0 |
| $B_{20}$ | Coding | 1 | Indicates a coding scheme |
| | MU-MIMO user number indication | 4 | Used to indicate the number of MU-MIMO users supported in a resource unit |

The receiving device determines RU allocation based on the at least one resource unit allocation subfield included in the PPDU and the resource unit allocation index corresponding to the resource unit allocation subfield, reads the per station field based on a predetermined sequence indicated in the resource unit allocation subfield, determines a per station field corresponding to the receiving device, the resource unit to which the receiving device belongs, the corresponding number of spatial streams, the modulation and coding scheme, and the like based on the station identifier carried in the per station field, and determines, based on the MU-MIMO user number indication subfield in the per station field corresponding to the receiving device, the number of MU-MIMO users supported in the resource unit to which the receiving device belongs. For example, when the resource unit to which the receiving device belongs is an RU whose size is greater than or equal to the 106-tone RU, the number of supported MU-MIMO users may be greater than 8. The MU-MIMO user number indication subfield included in the per station field is used to indicate the number of MU-MIMO users in the resource unit in which the station is located. In this way, efficiency of indicating the number of MU-MIMO users can be improved. In addition, this helps the receiving device perform parsing to obtain the number of MU-MIMO users. Therefore, efficiency of indicating the number of MU-MIMO users that is greater than 8 is improved.

In some other embodiments, a first per station field in the at least one per station field includes a third indication subfield, the first per station field corresponds to the resource unit that includes at least 106 subcarriers, and the third indication subfield is used to indicate whether a station indicated in the first per station field is a last station in the resource unit that includes at least 106 subcarriers.

Specifically, in addition to the foregoing manner of setting the MU-MIMO user number indication subfield used to indicate the number of MU-MIMO users supported in the resource unit in which the station is located in some or all of the per station fields, a 1-bit indication bit (the third indication subfield) may be set in all per station fields (first per station fields) in a specific resource unit (for example, an RU whose size is greater than or equal to the 106-tone RU), to indicate whether a station indicated in the per station field is a last MU-MIMO user in the resource unit or indicate whether the station is a first MU-MIMO user in the resource unit. After receiving the PPDU, the receiving device counts, based on all per station fields corresponding to a specific resource unit, the number of MU-MIMO users supported in the resource unit. For example, if the 1-bit indication bit is used to indicate whether the station indicated in the per station field is the last MU-MIMO user in the resource unit, the receiving device may determine, by collecting statistics from a first non-last station to a last station by using the 1-bit indication bit, the number of MU-MIMO users supported in the resource unit. The resource unit may be a resource unit that includes at least 106 subcarriers. The number of MU-MIMO users may be greater than 8.

For example, Table 6 shows subfields included in the per station field in an embodiment of this application. As shown in Table 6, the per station field includes a station identifier subfield, a space allocation subfield, a modulation and coding scheme subfield, a reserved field, and a coding subfield. As shown in Table 6, the 1-bit indication bit may be further added to the per station field, to indicate whether the station indicated in the per station field is the last MU-MIMO user in the resource unit.

TABLE 6

Content included in the per station field

| Bit | Subfield | Number of bits | Meaning |
|---|---|---|---|
| $B_0$-$B_{10}$ | Station identifier | 11 | Indicates identification information of a station |
| $B_{11}$-$B_{14}$ | Space allocation | 4 | Indicates the number of spatial streams of the STA in a MU-MIMO resource |
| $B_{15}$-$B_{18}$ | Modulation and coding scheme | 4 | Indicates a modulation and coding scheme of the station |
| $B_{19}$ | Reserved | 1 | Reserved and set to 0 |
| $B_{20}$ | Coding | 1 | Indicates a coding scheme |
|  | 1-bit indication | 1 | Indicates whether the station is the last or first MU-MIMO user in the resource unit |

According to the method for indicating the number of MU-MIMO users provided in this application, the MU-MIMO user number indication subfield used for the number of MU-MIMO users is set in the per station field in the signal field B, or the indication subfield is set in all the per station fields in the specific resource unit, to indicate whether the station is the last station or the first station supported in the resource unit. In this way, a case in which the number of users supported in the RU whose size is greater than or equal to a 106-tone RU is greater than 8 is indicated. Therefore, the number of MU-MIMO users that is greater than 8 can be accurately and conveniently indicated. In addition, an existing resource unit allocation index table does not need to be changed, and this is easy to implement. Therefore, efficiency of indicating the number of MU-MIMO users that is greater than 8 is improved.

It should be understood that, in the embodiments of this application, "first", "second", and the like are merely intended to indicate that a plurality of objects are different. For example, the first index and the second index are merely intended to represent different indexes, and should not impose any impact on the indexes and quantities. "First", "second", and the like described above should not impose any limitation on the embodiments of this application.

It should be further understood that division of manners, cases, types, and embodiments in the embodiments of this application are merely for ease of description, but should not constitute special limitation, and features in various manners, types, cases, and embodiments may be combined when there is no contradiction.

It should be further understood that numerals used in the embodiments of this application are differentiated merely for ease of description, but are not used to limit the scope of the embodiments of this application. The sequence numbers of the foregoing processes do not mean execution sequences. The execution sequences of the processes should be determined according to functions and internal logic of the processes, and should not be construed as any limitation on the implementation processes of the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200, method 300, and method 400 may be unnecessary, or some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on differences between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application.

The method for indicating the number of MU-MIMO users according to the embodiments of this application is described above in detail with reference to FIG. 1 to FIG. 23. The following describes in detail communications apparatuses in the embodiments of this application with reference to FIG. 24 to FIG. 29.

Figure 24:
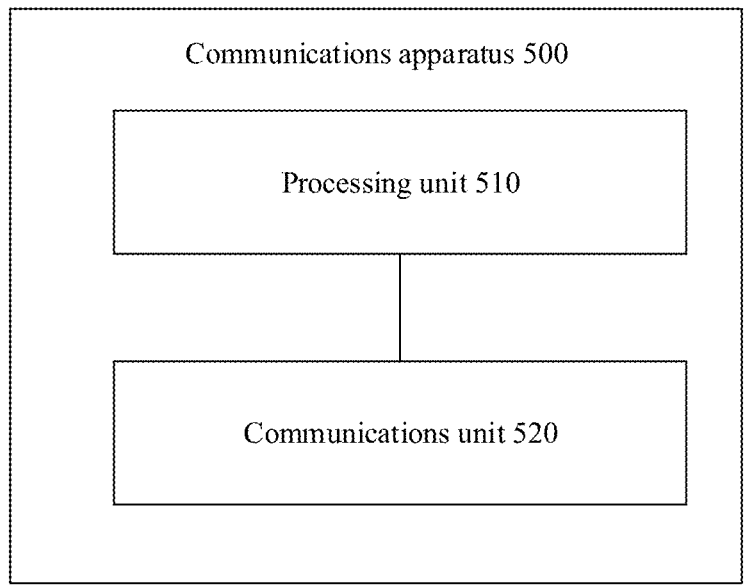
FIG. 24 is a schematic diagram of a communications apparatus according to an embodiment of this application.

FIG. 24 is a schematic block diagram of a communications apparatus 500 according to an embodiment of this application. The apparatus 500 may correspond to the sending device described in the method 200 to the method 400, or may be a chip or a component used in the sending device. In addition, modules or units in the apparatus 500 are respectively configured to perform actions or processing processes performed by the sending device in the method 200 to the method 400. As shown in FIG. 24, the communications apparatus 500 may include a processing unit 510 and a communications unit 520.

The processing unit 410 is configured to generate a physical layer protocol data unit PPDU. The PPDU includes a signal field B. The signal field B includes at least one resource unit allocation subfield. The resource unit allocation subfield is a resource unit allocation index. The resource unit allocation index is used to indicate a resource unit arrangement and combination. The resource unit allocation index is further used to indicate the number of multi-user multiple-input multiple-output MU-MIMO users supported in a resource unit that includes at least 106 subcarriers. The number of MU-MIMO users is greater than 8.

Alternatively, the PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8.

Alternatively, the PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8.

The communications unit 520 is configured to send the PPDU.

According to the communications apparatus provided in this application, the resource unit allocation subfield is designed, or a new indication field is added, to indicate a case in which the number of users supported in the RU whose size is greater than or equal to a 106-tone RU is greater than 8. Therefore, resource utilization and communication efficiency are improved.

It should be understood that for a specific process of performing the foregoing corresponding steps by the units in the apparatus 500, refer to the foregoing descriptions with reference to the method embodiments in FIG. 2 to FIG. 23. For brevity, details are not described herein again.

Optionally, the communications unit 520 may include a receiving unit (module) and a sending unit (module) configured to perform the steps of sending information by the sending device in the method 200 to the method 400, FIG. 4, FIG. 11, FIG. 12, FIG. 18, and FIG. 23. Optionally, the communications apparatus 500 may further include a storage unit 550. The storage unit 550 is configured to store instructions executed by the communications unit 520 and the processing unit 510. The communications unit 520, the processing unit 510, and the storage unit 550 are coupled to each other. The storage unit 550 stores the instructions. The processing unit 510 is configured to execute the instructions stored in the storage unit 550. The communications unit 520 is configured to send or receive a specific signal under driving of the processing unit 510.

Figure 25:
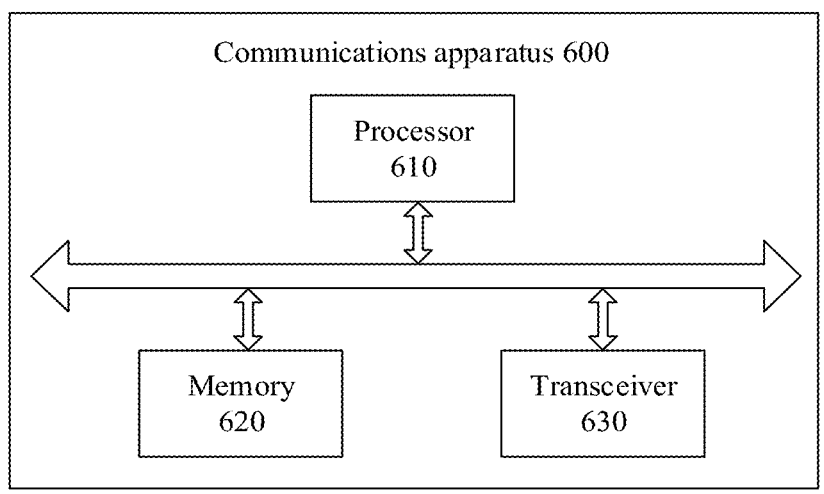
FIG. 25 is a schematic diagram of another communications apparatus according to an embodiment of this application.

The processing unit 510 may be a processor. The communications unit 520 may be a transceiver, an input/output interface, or an interface circuit. The storage unit 530 may be a memory. As shown in FIG. 25, a communications apparatus 600 may include a processor 610, a memory 620, and a transceiver 630. When the communications apparatus is a chip in a communications device, the storage unit may be a storage unit (for example, a register or a cache) in the chip, or may be a storage unit (for example, a read-only memory or a random access memory) outside the chip in the communications device.

It may be clearly understood by a person skilled in the art that, for steps performed by the communications apparatuses 500 and 600 and corresponding beneficial effects, refer to the related descriptions of the sending device in the method 200 to the method 400. For brevity, details are not described herein again.

The communications apparatus 500 or 600 may be a terminal device or a network device.

Figure 26:
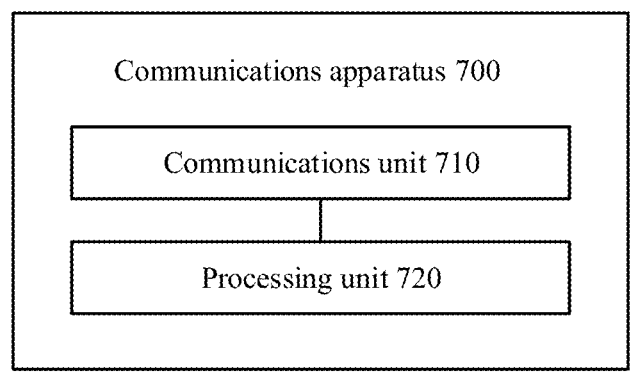
FIG. 26 is a schematic diagram of a communications apparatus according to an embodiment of this application.

FIG. 26 is a schematic block diagram of a communications apparatus 700 according to an embodiment of this application. The apparatus 700 may correspond to the receiving device described in the method 200, or may be a chip or a component used in the receiving device. Modules or units in the apparatus 700 are respectively configured to perform actions or processing processes performed by the receiving device in the method 200 to the method 400. As shown in FIG. 26, the communications apparatus 700 may include a communications unit 710 and a processing unit 720.

The communications unit 710 is configured to receive a physical layer protocol data unit PPDU. The PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8.

Alternatively, the PPDU includes a signal field B. The signal field B includes at least one resource unit allocation subfield and a second indication field. The resource unit allocation subfield is used to indicate a resource unit arrangement and combination. The at least one resource unit allocation subfield and the second indication field jointly indicate the number of MU-MIMO users supported in a resource unit that includes at least 106 subcarriers. The number of MU-MIMO users is greater than 8.

Alternatively, the PPDU includes a signal field B. The signal field B includes at least one resource unit allocation subfield and at least one per station field. The resource unit allocation subfield is used to indicate a resource unit arrangement and combination. A sequence of the at least one per station field corresponds to a sequence of the resource unit arrangement and combination. The per station field is used to indicate the number of MU-MIMO users supported in a resource unit that includes at least 106 subcarriers. The number of MU-MIMO users is greater than 8.

The processing unit 720 is configured to determine, based on the PPDU, the number of MU-MIMO users supported in the resource unit that includes at least 106 subcarriers.

According to the communications apparatus provided in this application, the resource unit allocation subfield is designed, or a new indication field is added, to indicate a case in which the number of users supported in the RU whose size is greater than or equal to a 106-tone RU is greater than 8. Therefore, resource utilization and communication efficiency are improved.

It should be understood that for a specific process of performing the foregoing corresponding steps by the units in the apparatus 700, refer to the foregoing descriptions with reference to the method embodiments in FIG. 2 to FIG. 16. For brevity, details are not described herein again.

Optionally, the communications unit 710 may include a receiving unit (module) and a sending unit (module) configured to perform the steps of receiving information by the receiving device in the method 200 to the method 400, FIG. 4, FIG. 11, FIG. 12, FIG. 18, and FIG. 23. Optionally, the communications apparatus 700 may further include a storage unit 730. The storage unit 730 is configured to store instruction executed by the communications unit 710 and the processing unit 720. The communications unit 710, the processing unit 720, and the storage unit 730 are coupled to each other. The storage unit 730 stores the instructions. The processing unit 720 is configured to execute the instructions stored in the storage unit 730. The communications unit 710 is configured to send or receive a specific signal under driving of the processing unit 720.

Figure 27:
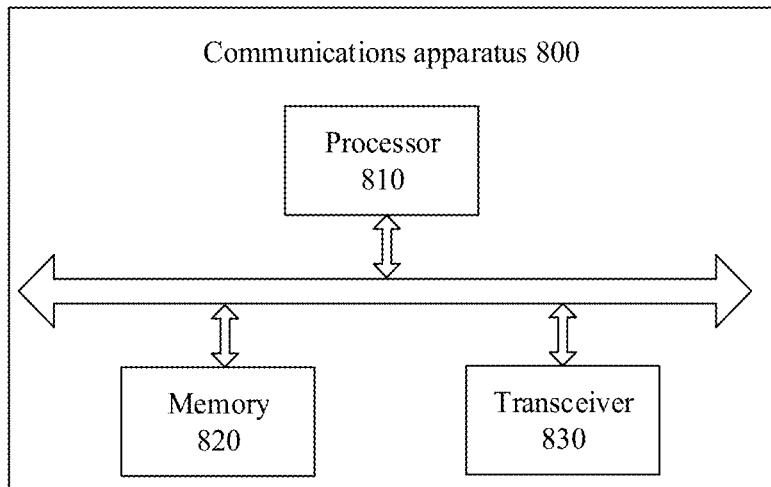
FIG. 27 is a schematic diagram of another communications apparatus according to an embodiment of this application.

It should be understood that the processing unit 720 may be implemented by a processor, the communications unit 710 may be implemented by a transceiver, and the storage unit 730 may be implemented by a memory. As shown in FIG. 27, a communications apparatus 800 may include a processor 810, a memory 820, and a transceiver 830.

It may be clearly understood by a person skilled in the art that, for steps performed by the communications apparatuses 700 and 800 and corresponding beneficial effects, refer to the related descriptions of the receiving device in the method 200 to the method 400. For brevity, details are not described herein again.

The communications apparatus 700 or 800 may be a terminal device or a network device.

It should be further understood that division into the units in the apparatus is merely division into logical functions. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing methods or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing methods, for example, one or more application specific integrated circuits (ASIC), one or more digital signal processors (DSP), one or more field programmable gate arrays (FPGA), or a combination of at least two of these integrated circuits. For another example, when the unit in the apparatus is implemented by scheduling a program by a processing element, the processing element may be a general-purpose processor, for example, a central processing unit (CPU) or another processor that can invoke the program. For another example, these units may be integrated together, and implemented in a form of a system-on-a-chip (SOC).

Figure 28:
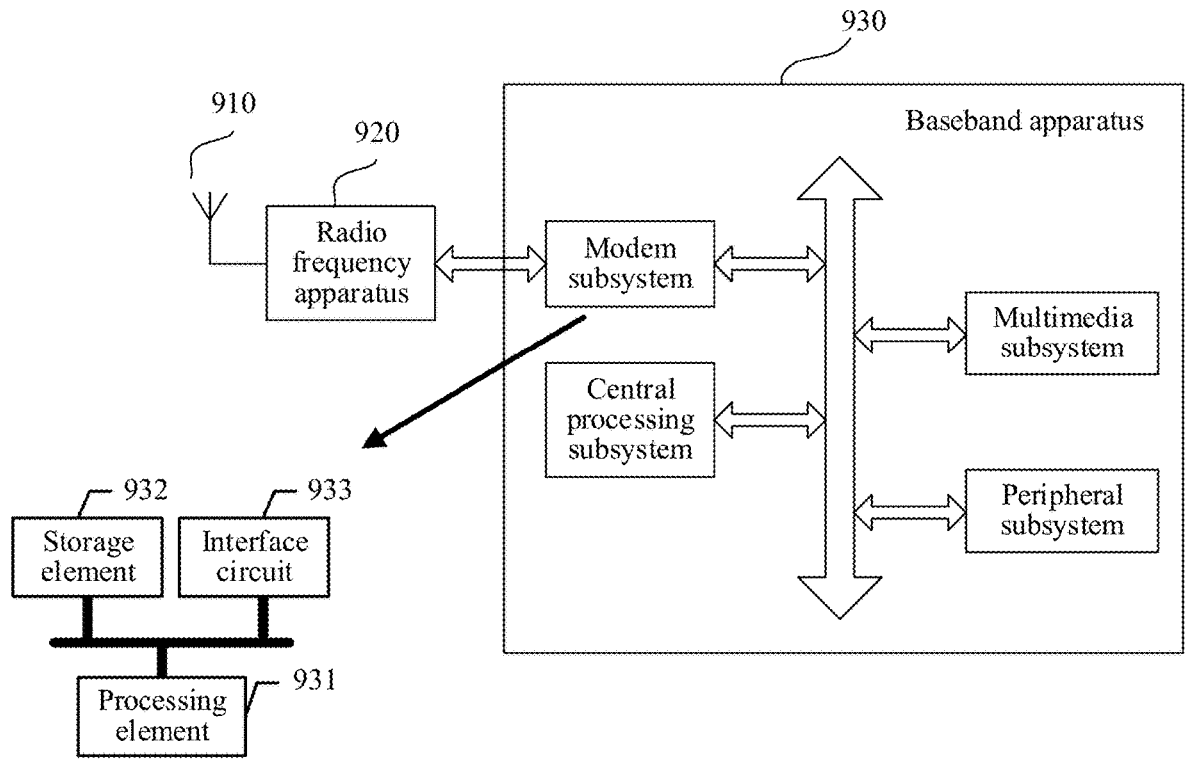
FIG. 28 is a schematic diagram of a terminal device according to an embodiment of this application.

FIG. 28 is a schematic diagram of a structure of a terminal device according to an embodiment of this application. The terminal device may be the terminal device in the foregoing embodiments, and is configured to implement the operations of the terminal device in the foregoing embodiments. As shown in FIG. 28, the terminal device includes an antenna 910, a radio frequency apparatus 920, and a baseband apparatus 930. The antenna 910 is connected to the radio frequency apparatus 920. In a downlink direction, the radio frequency apparatus 920 receives, by using the antenna 910, information sent by a network device, and sends, to the baseband apparatus 930 for processing, the information sent by the network device. In an uplink direction, the baseband apparatus 930 processes information about the terminal device, and sends the information to the radio frequency apparatus 920. The radio frequency apparatus 920 processes the information about the terminal device, and then sends the processed information to the network device by using the antenna 910.

The baseband apparatus 930 may include a modem subsystem, configured to process data at each communication protocol layer. The baseband apparatus 930 may further include a central processing subsystem, configured to implement processing on an operating system and an application layer of the terminal. In addition, the baseband apparatus 930 may further include another subsystem, for example, a multimedia subsystem or a peripheral subsystem. The multimedia subsystem is configured to control a camera, screen display, and the like of the terminal device, and the peripheral subsystem is configured to implement a connection to another device. The modem subsystem may be an independent chip. Optionally, the foregoing apparatus used in the terminal may be located in the modulation subsystem.

The modem subsystem may include one or more processing elements 931, for example, include one main control CPU and another integrated circuit. In addition, the modem subsystem may further include a storage element 932 and an interface circuit 933. The storage element 932 is configured to store data and a program, but a program used to perform the method performed by the terminal device in the foregoing methods may not be stored in the storage element 932, but is stored in a memory outside the modem subsystem. The interface circuit 933 is configured to communicate with another subsystem. The foregoing apparatus used in the terminal device may be located in the modem subsystem, and the modem subsystem may be implemented by using a chip. The chip includes at least one processing element and an interface circuit. The processing element is configured to perform the steps of any one of the methods performed by the terminal device. The interface circuit is configured to communicate with another apparatus. In an implementation, the units in the terminal device that implement the steps in the foregoing methods may be implemented by scheduling a program by a processing element. For example, the apparatus used in the terminal device includes a processing element and a storage element. The processing element invokes a program stored in the storage element, to perform the methods performed by the terminal in the foregoing method embodiments. The storage element may be a storage element that is on the same chip as the processing unit, that is, an on-chip storage element.

In another implementation, a program used to perform the method performed by the terminal device in the foregoing method may be in a storage element that is on a different chip from the processing unit, that is, an off-chip storage element. In this case, the processing element invokes or loads the program from the off-chip storage element to an on-chip storage element, to invoke and perform the method performed by the terminal in the foregoing method embodiment.

In still another implementation, the units in the terminal device that implement the steps in the foregoing methods may be configured as one or more processing elements. These processing elements are disposed on the modem subsystem. The processing element herein may be an integrated circuit, for example, one or more ASICs, one or more DSPs, one or more FPGAs, or a combination of these types of integrated circuits. These integrated circuits may be integrated together to form a chip.

The units in the terminal device that implement the steps in the foregoing methods may be integrated together, and implemented in a form of a system-on-a-chip (system-on-a-chip, SOC). The SOC chip is configured to implement the foregoing methods.

Figure 29:
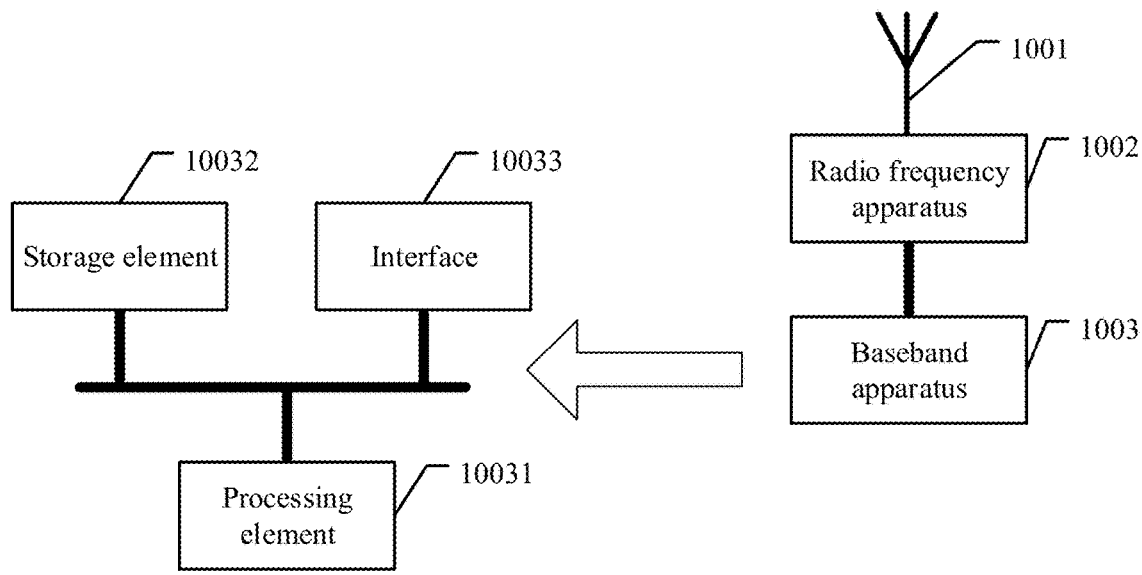
FIG. 29 is a schematic diagram of a network device according to an embodiment of this application.

FIG. 29 is a schematic diagram of a structure of a network device according to an embodiment of this application. The network device is configured to implement the operations of the network device in the foregoing embodiments. As shown in FIG. 29, the network device includes an antenna 1001, a radio frequency apparatus 1002, and a baseband apparatus 1003. The antenna 1001 is connected to the radio frequency apparatus 1002. In an uplink direction, the radio frequency apparatus 1002 receives, by using the antenna 1001, information sent by a terminal, and sends, to the baseband apparatus 1003 for processing, the information sent by the terminal device. In a downlink direction, the baseband apparatus 1003 processes information about the terminal, and sends the information to the radio frequency apparatus 1002. The radio frequency apparatus 1002 processes the information about the terminal device, and then sends the processed information to the terminal by using the antenna 1001.

The baseband apparatus 1003 may include one or more processing elements 10031, for example, include a main control CPU and another integrated circuit. In addition, the baseband apparatus 1003 may further include a storage element 10032 and an interface circuit 10033. The storage element 10032 is configured to store a program and data. The interface circuit 10033 is configured to exchange information with the radio frequency apparatus 1002, and the interface is, for example, a common public radio interface (common public radio interface, CPRI). The foregoing apparatus used in the network device may be located in the baseband apparatus 1003. For example, the foregoing apparatus used in the network device may be a chip in the baseband apparatus 1003. The chip includes at least one processing element and an interface circuit. The processing element is configured to perform steps in any method performed by the network device. The interface circuit is configured to communicate with another apparatus. In an implementation, the units in the network device that implement the steps in the foregoing method may be implemented in a form of scheduling a program by the processing element. For example, the apparatus used in the network device includes a processing element and a storage element. The processing element invokes a program stored in the storage element, to perform the method performed by the network device in the foregoing method embodiment. The storage element may be a storage element on the same chip as the processing element, that is, an on-chip storage element; or may be a storage element that is on a different chip from the processing element, that is, an off-chip storage element.

In another implementation, the units in the network device that implement the steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units in the network device that implement the steps in the foregoing methods may be integrated together, and implemented in a form of a system-on-a-chip. For example, the baseband apparatus includes the SOC chip, configured to implement the foregoing methods.

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

An embodiment of this application further provides a communications system. The communications system includes the foregoing sending device and the foregoing receiving device.

An embodiment of this application further provides a computer-readable medium, configured to store computer program code. The computer program includes instructions used to perform the method for indicating the number of MU-MIMO users in the embodiments of this application in the method 200 to the method 400. The readable medium may be a read-only memory (read-only memory, ROM) or a random access memory (random access memory, RAM). This is not limited in this embodiment of this application.

This application further provides a computer program product. The computer program product includes instructions. When the instructions are executed, the sending device and the receiving device are enabled to perform operations corresponding to the sending device and the receiving device in the foregoing methods.

An embodiment of this application further provides a system chip. The system chip includes a processing unit and a communications unit. The processing unit may be, for example, a processor, and the communications unit may be, for example, an input/output interface, a pin, or a circuit. The processing unit may execute computer instructions, so that the system chip performs any one of the method for indicating the number of MU-MIMO users provided in the foregoing embodiments of this application.

Optionally, the computer instructions are stored in a storage unit.

Optionally, the storage unit is a storage unit in the chip, for example, a register or a cache; or the storage unit may be a storage unit in the terminal but outside the chip, for example, a read-only memory (ROM), another type of static storage device capable of storing static information and instructions, or a random access memory (RAM). The processor mentioned in any of the foregoing descriptions may be a CPU, a microprocessor, an ASIC, or one or more integrated circuits for controlling program execution of the foregoing feedback information method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a nonvolatile memory, or may include a volatile memory and a nonvolatile memory. The nonvolatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terms "system" and "network" may be usually used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "I" in this specification generally indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the terms "uplink" and the "downlink" are only used to describe transmission directions of data/information, and neither a specific start device nor a specific end device of the data/information transmission is limited.

Names may be assigned to various objects that may appear in this application, for example, various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

All or some of the methods in the embodiments of this application may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or other programmable apparatuses. The computer programs or instructions may be stored in a computer-readable storage medium, or may be transmitted via the computer-readable storage medium. The computer-readable storage medium may be any usable medium accessible by a computer, or a data storage device, such as a server integrating one or more usable media.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for indicating the number of multi-user multiple-input multiple-output (MU-MIMO) users, comprising:
    generating a physical layer protocol data unit (PPDU), wherein the PPDU comprises a signal field B, the signal field B comprises at least one resource unit allocation subfield, the at least one resource unit allocation subfield is a resource unit allocation index, the resource unit allocation index is used to indicate a resource unit arrangement and combination, the resource unit allocation index is further used to indicate the number of MU-MIMO users supported in a resource unit that consists of at least 106 subcarriers, and the number of MU-MIMO users is greater than 8; and
    sending the PPDU.

2. The method according to claim 1, wherein the resource unit allocation index comprises a first index and a second index that are used to indicate a same resource unit arrangement and combination, the first index indicates the number of MU-MIMO users supported in the resource unit that consists of at least 106 subcarriers, the number of MU-MIMO users is less than or equal to 8, the second index indicates the number of MU-MIMO users supported in the resource unit that consists of at least 106 subcarriers, and the number of MU-MIMO users is greater than 8.

3. The method according to claim 1, wherein the resource unit allocation index comprises a field used to indicate the number of MU-MIMO users supported in the resource unit that consists of at least 106 subcarriers, a length of the field is greater than or equal to 4 bits, and the number of MU-MIMO users is greater than 8.

4. The method according to claim 1, wherein the signal field B further comprises a first indication subfield, and the first indication subfield is used to indicate a bit width of the resource unit allocation index.

5. The method according to claim 1, wherein the resource unit allocation index is an 8-bit index or a 9-bit index.

6. A method for indicating the number of multi-user multiple-input multiple-output (MU-MIMO) users, comprising:
receiving a physical layer protocol data unit (PPDU), wherein the PPDU comprises a signal field B, the signal field B comprises at least one resource unit allocation subfield, the at least one resource unit allocation subfield is a resource unit allocation index, the resource unit allocation index is used to indicate a resource unit arrangement and combination, the resource unit allocation index is further used to indicate the number of MU-MIMO users supported in a resource unit that consists of at least 106 subcarriers, and the number of MU-MIMO users is greater than 8; and
determining, based on the at least one resource unit allocation subfield, the number of MU-MIMO users supported in the resource unit that consists of at least 106 subcarriers.

7. The method according to claim 6, wherein the resource unit allocation index comprises a first index and a second index that are used to indicate a same resource unit arrangement and combination, the first index indicates the number of MU-MIMO users supported in the resource unit that consists of at least 106 subcarriers, the number of MU-MIMO users is less than or equal to 8, the second index indicates the number of MU-MIMO users supported in the resource unit that consists of at least 106 subcarriers, and the number of MU-MIMO users is greater than 8; and
the determining, based on the at least one resource unit allocation subfield, the number of MU-MIMO users supported in the resource unit that consists of at least 106 subcarriers comprises:
determining, based on the first index and the second index, the number of MU-MIMO users supported in the resource unit that consists of at least 106 subcarriers.

8. The method according to claim 6, wherein the resource unit allocation index comprises a field used to indicate the number of MU-MIMO users supported in the resource unit that consists of at least 106 subcarriers, a length of the field is greater than or equal to 4 bits, and the number of MU-MIMO users is greater than 8; and
the determining, based on the at least one resource unit allocation subfield, the number of MU-MIMO users supported in the resource unit that consists of at least 106 subcarriers comprises:
determining, based on the field, the number of MU-MIMO users supported in the resource unit that consists of at least 106 subcarriers.

9. The method according to claim 6, wherein the signal field B further comprises a first indication subfield, and the first indication subfield is used to indicate a bit width of the at least one resource unit allocation index; and
the method further comprises:
determining the bit width of the resource unit allocation index based on the first indication subfield.

10. The method according to claim 6, wherein the resource unit allocation index is an 8-bit index or a 9-bit index.

11. An apparatus for indicating the number of multi-user multiple-input multiple-output (MU-MIMO) users, comprising:
a processor, configured to generate a physical layer protocol data unit (PPDU), wherein the PPDU comprises a signal field B, the signal field B comprises at least one resource unit allocation subfield, the at least one resource unit allocation subfield is a resource unit allocation index, the resource unit allocation index is used to indicate a resource unit arrangement and combination, the resource unit allocation index is further used to indicate the number of MU-MIMO users supported in a resource unit that consists of at least 106 subcarriers, and the number of MU-MIMO users is greater than 8; and
a transceiver, configured to send the PPDU.

12. The apparatus according to claim 11, wherein the resource unit allocation index comprises a first index and a second index that are used to indicate a same resource unit arrangement and combination, the first index indicates the number of MU-MIMO users supported in the resource unit that consists of at least 106 subcarriers, the number of MU-MIMO users is less than or equal to 8, the second index indicates the number of MU-MIMO users supported in the resource unit that consists of at least 106 subcarriers, and the number of MU-MIMO users is greater than 8.

13. The apparatus according to claim 11, wherein the resource unit allocation index comprises a field used to indicate the number of MU-MIMO users supported in the resource unit that consists of at least 106 subcarriers, a length of the field is greater than or equal to 4 bits, and the number of MU-MIMO users is greater than 8.

14. The apparatus according to claim 11, wherein the signal field B further comprises a first indication subfield, and the first indication subfield is used to indicate a bit width of the resource unit allocation index.

15. The apparatus according to claim 11, wherein the resource unit allocation index is an 8-bit index or a 9-bit index.

* * * * *